(12) United States Patent
Jenkinson et al.

(10) Patent No.: US 10,901,776 B2
(45) Date of Patent: Jan. 26, 2021

(54) EFFICIENT AND SCALABLE TRANSACTION PROCESSING USING A CONSENSUS-BASED TRANSACTION MODEL

(71) Applicant: Red Hat, Inc., Raleigh, NC (US)

(72) Inventors: Thomas J. Jenkinson, Newcastle upon Tyne (GB); Paul F. Robinson, Farnborough (GB)

(73) Assignee: Red Hat, Inc., Raleigh, NC (US)

( * ) Notice: Subject to any disclaimer, the term of this patent is extended or adjusted under 35 U.S.C. 154(b) by 322 days.

(21) Appl. No.: 15/830,385

(22) Filed: Dec. 4, 2017

(65) Prior Publication Data
US 2019/0171478 A1 Jun. 6, 2019

(51) Int. Cl.
| | | |
|---|---|---|
| *G06F 16/00* | (2019.01) | |
| *G06F 9/46* | (2006.01) | |
| *G06F 9/50* | (2006.01) | |
| *G06F 11/14* | (2006.01) | |
| *G06F 16/245* | (2019.01) | |
| *G06F 16/23* | (2019.01) | |

(52) U.S. Cl.
CPC .............. *G06F 9/466* (2013.01); *G06F 9/505* (2013.01); *G06F 11/1474* (2013.01); *G06F 16/2308* (2019.01); *G06F 16/2379* (2019.01); *G06F 16/245* (2019.01)

(58) Field of Classification Search
CPC .............................. G06F 9/466; G06F 2201/87
See application file for complete search history.

(56) References Cited

U.S. PATENT DOCUMENTS

| | | |
|---|---|---|
| 6,526,416 B1 | 2/2003 | Long |
| 7,433,898 B1 | 10/2008 | Georgiev |
| 7,661,099 B2 | 2/2010 | Farchi et al. |
| 7,730,489 B1 | 6/2010 | Duvur et al. |

(Continued)

OTHER PUBLICATIONS

Author Unknown, "Fusion Middleware Programming JTA for Oracle WebLogic Server," Help Center, docs.oracle.com/middleware/11119/WLJTA/trxman.htm, accessed Nov. 7, 2017, Oracle, 16 pages.

(Continued)

*Primary Examiner* — Hung Q Pham
(74) *Attorney, Agent, or Firm* — Withrow & Terranova, PLLC

(57) ABSTRACT

An efficient and scalable transaction processing using a consensus-based transaction model is disclosed. A transaction processor receives a transaction that includes a plurality of update subtransactions to be performed against a corresponding plurality of resources. A transaction identifier (ID) that corresponds to the transaction is determined. For each resource of the plurality of resources, the transaction ID is sent to a resource manager associated with the resource to determine a status of the corresponding update subtransaction as one of 1) a not seen status, 2) a prepared status, or 3) a committed status. Based on the status of the corresponding update subtransaction, any action against the resource via the resource manager that is necessary to bring the status of the corresponding update subtransaction to the committed status is performed. The transaction is marked as being completed.

14 Claims, 19 Drawing Sheets

(56) References Cited

U.S. PATENT DOCUMENTS

| | | |
|---|---|---|
| 8,924,346 B2 | 12/2014 | Colrain et al. |
| 9,141,351 B2 | 9/2015 | Darcy |
| 2015/0261563 A1* | 9/2015 | Guerin .............. G06F 16/90335 707/703 |
| 2015/0317349 A1* | 11/2015 | Chao ................... G06F 16/2336 707/615 |
| 2016/0147617 A1 | 5/2016 | Lee et al. |

OTHER PUBLICATIONS

Author Unknown, "Interface XAResource," Java Platform, Standard Editon 7, docs.oracle.com/javaee/5/api/javax/transaction/xa/XAResource.html, accessed Nov. 14, 2017, 8 pages.

Das, Sudipto, et al., "ElasTraS: An Elastic, Scalable, and Self Managing Transactional Database for the Cloud," UCSB Computer Science Technical Report, Apr. 2010, 14 pages.

\* cited by examiner

US 10,901,776 B2

EFFICIENT AND SCALABLE TRANSACTION PROCESSING USING A CONSENSUS-BASED TRANSACTION MODEL

TECHNICAL FIELD

The examples relate generally to updating multiple heterogeneous resource managers, such as databases, in a single transaction in an efficient and scalable manner.

BACKGROUND

It is often necessary for multiple different resources, such as databases, to be updated collectively in a single atomic transaction. If all the resources cannot be updated, then none of the resources are updated. This process is often performed by a transaction manager function. A consensus protocol, such as a two-phase commit consensus protocol, may be used to ensure that all resources can be updated, or that all resources can be set back to their respective state prior to the transaction in the event that it is not possible to update all the resources.

SUMMARY

The examples disclosed herein provide a transaction processing system for implementing atomic transactions among heterogeneous resources using a consensus-based transaction model. Among other advantages, the examples support clustering such that any transaction manager within a cluster is able to respond to requests from a client application, allow load balancing over transaction managers to provide horizontal scalability, and provide fault tolerance of the transaction managers to facilitate efficient recovery.

In one example a method is provided. The method includes receiving, by a transaction processor, a transaction comprising a plurality of update subtransactions to be performed against a corresponding plurality of resources. The method further includes determining a transaction identifier (ID) that corresponds to the transaction. The method further includes, for each resource of the plurality of resources: sending the transaction ID to a resource manager associated with the resource to determine a status of the corresponding update subtransaction as one of 1) a not seen status, 2) a prepared status, or 3) a committed status, and, based on the status of the corresponding update subtransaction, performing any action against the resource via the resource manager that is necessary to bring the status of the corresponding update subtransaction to the committed status. The method further includes marking the transaction as being completed.

In another example a computing device is provided. The computing device includes a memory and a processor device coupled to the memory. The processor device is to receive a transaction comprising a plurality of update subtransactions to be performed against a corresponding plurality of resources. The processor device is further to determine a transaction identifier (ID) that corresponds to the transaction. The processor device is further to, for each resource of the plurality of resources: send the transaction ID to a resource manager associated with the resource to determine a status of the corresponding update subtransaction as one of 1) a not seen status, 2) a prepared status, or 3) a committed status, and based on the status of the corresponding update subtransaction, perform any action against the resource via the resource manager that is necessary to bring the status of the corresponding update subtransaction to the committed status. The processor device is further to mark the transaction as being completed.

In another example a computer program product is provided. The computer program product is stored on a non-transitory computer-readable storage medium and includes instructions to cause a processor device to receive a transaction comprising a plurality of update subtransactions to be performed against a corresponding plurality of resources. The instructions further cause the processor device to determine a transaction identifier (ID) that corresponds to the transaction. The instructions further cause the processor device to, for each resource of the plurality of resources: send the transaction ID to a resource manager associated with the resource to determine a status of the corresponding update subtransaction as one of 1) a not seen status, 2) a prepared status, or 3) a committed status, and based on the status of the corresponding update subtransaction, perform any action against the resource via the resource manager that is necessary to bring the status of the corresponding update subtransaction to the committed status. The instructions further cause the processor device to mark the transaction as being completed.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
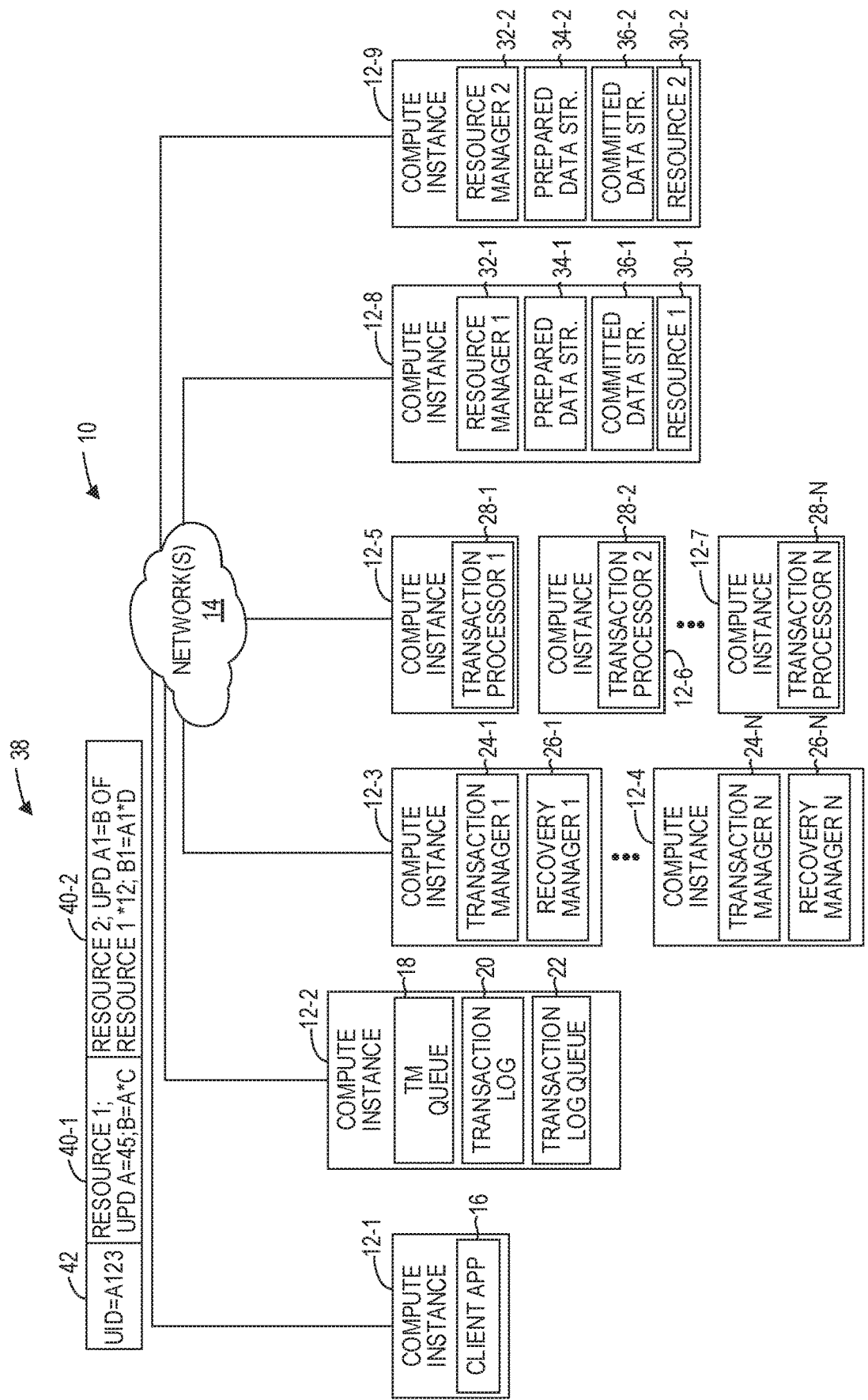
FIG. 1 is a block diagram in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first resource" and "second resource," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

It is often necessary for multiple different resources, such as databases, to be updated collectively in a single atomic transaction. If all the resources cannot be updated, then none of the resources are updated. This process is often performed by a transaction manager function. A consensus protocol, such as a two-phase commit consensus protocol, may be used to ensure that all resources can be updated, or that all resources can be set back to their respective state prior to the transaction in the event that it is not possible to update all the resources.

Because the transaction manager function itself may fault during the transaction, conventional transaction manager functions maintain state regarding the transaction. Consequently, the particular transaction manager function handling the transaction may be required to complete the transaction when the transaction manager function re-initiates. Maintaining such state information can thus inhibit scalability of transaction processing systems.

Among other advantages, the transaction manager functions disclosed herein do not maintain a state outside of the resources being updated, and thus reduce the lock window size because a transaction that was not completed due to a fault can be repeated immediately without waiting for a quorum of transaction processors to elect a new leader.

The examples disclosed herein provide a transaction processing system that, among other advantages, supports clustering such that any transaction manager function within a cluster is able to respond to requests from a client application, allows load balancing over transaction manager functions to provide horizontal scalability, provides fault tolerance of the transaction manager functions to facilitate efficient recovery, and supports elastic cluster size, and the transaction manager function is not required to maintain state.

The examples herein disclose a transaction processing system that maintains state in the resources being updated, and thus, any transaction processor can process any transaction, including partially completed transactions. This results in a highly-scalable transaction processing system.

Solely for purposes of illustration, the transaction processing system will be discussed herein in conjunction with a two-phase commit consensus protocol; however, the examples may utilize any consensus protocol, including, by way of non-limiting example, a three-phase commit consensus protocol or a Raft consensus protocol.

FIG. 1 is a block diagram in which examples may be practiced. An environment 10 includes a plurality of compute instances 12-1-12-9 (generally, compute instances 12) communicatively coupled via one or more networks 14. A compute instance 12 refers to a discrete runtime environment and may comprise a physical machine configured to run an operating system, or the compute instance 12 may comprise a virtual machine that runs on a physical machine and emulates a physical machine. A virtual machine typically runs a guest operating system in conjunction with a virtual machine monitor, such as a hypervisor, that is configured to coordinate access to physical resources of a physical machine, such as a memory and a processor device, by the virtual machines running on the physical machine. A compute instance 12 thus, whether a physical machine or a virtual machine, includes a memory and a processor device. While for purposes of illustration nine compute instances 12 are illustrated, the environment 10 may in practice have tens, hundreds, or thousands of compute instances 12, and is particularly suitable for a highly scalable environment, such as a cloud computing environment.

Although many of the components that are discussed herein are illustrated as executing on separate compute instances 12, it will be apparent that many, or all, components may in some circumstances be implemented on a single compute instance 12, if desired, depending on processing and bandwidth requirements. The compute instance 12-1 includes a client application (APP) 16. The compute instance 12-2 includes a transaction manager (TM) queue 18, a transaction log 20, and a transaction log queue 22. The compute instance 12-3 includes a transaction manager 24-1 and a recovery manager 26-1. The compute instance 12-4 includes a transaction manager 24-N and a recovery manager 26-N. The transaction manager 24-1 and the transaction manager 24-N may be generally referred to herein as a transaction manager 24. While only two transaction managers 24 are illustrated, the examples can scale to use any number of transaction managers 24 as needed or desired in the environment 10.

The compute instance 12-5 includes a transaction processor 28-1; the compute instance 12-6 includes a transaction processor 28-2; and the compute instance 12-7 includes a transaction processor 28-N. The transaction processors 28-1, 28-2, and 28-N may be generally referred to herein as a transaction processor 28. While only three transaction processors 28 are illustrated, the examples can scale to use any number of transaction processors 28 as needed or desired in the environment 10. A transaction manager 24 in conjunction with one or more transaction processors 28 collectively provide a transaction management function. The examples are scalable in that both transaction managers 24 can be initiated based on a demand basis, and the transaction processors 28 can be initiated based on a demand basis.

The compute instance 12-8 includes a resource 30-1. The resource 30-1 may represent any updateable entity with a consensus update functionality, such as a database or a message queue. The compute instance 12-8 also includes a resource manager 32-1 that represents a component that manages the actual updating of the resource 30-1. In the context of a database, the resource 30-1 may comprise, for example, tables or other data structures that make up the database, and the resource manager 32-1 may represent access routine software (such as a relational database management system (RDMS)) that is called or invoked to effect changes to or queries on the resource 30-1.

The compute instance 12-8 also includes a prepared data structure 34-1 that corresponds to the resource 30-1 and the resource manager 32-1. The resource manager 32-1 utilizes the prepared data structure 34-1 to make an update on the resource 30-1 durable (i.e., saved but not yet committed) prior to committing the update to the resource 30-1. This may be done, for example, in response to a request to perform a "prepare" operation of a two-phase commit consensus protocol. The compute instance 12-8 also includes a committed data structure 36-1 that corresponds to the resource 30-1, the resource manager 32-1, and the prepared data structure 34-1 in which a transaction identifier (ID) of a transaction is stored after the update has been committed to the resource 30-1. This may be done, for example, in response to a request to perform a "commit" operation of a two-phase commit consensus protocol.

The compute instance 12-9 includes a resource 30-2, a resource manager 32-2, a prepared data structure 34-2, and a committed data structure 36-2. The resource 30-2 is a distinct resource from the resource 30-1; however, the functionality of the resource manager 32-2, the prepared data structure 34-2, and the committed data structure 36-2 are substantially similar to the functionality of the resource manager 32-1, the prepared data structure 34-1, and the committed data structure 36-1 as discussed above. While for purposes of illustration and simplicity the examples disclosed herein will be discussed in the context of transactions that involve updating the two resources 30-1 and 30-2, the examples are not limited to transactions that involve updating only two resources 30, and are applicable for updating any number of resources 30 in an atomic transaction.

With this background, an example will be provided to illustrate high-level processing of a transaction. The client application 16 generates a transaction 38. The transaction 38 includes a first subtransaction 40-1 and a second subtransaction 40-2 (generally, subtransactions 40). The subtransaction 40-1 identifies a series of updates (i.e., "work") to be performed against the resource 30-1. The subtransaction 40-2 identifies a series of updates to be performed against the resource 30-2. The format of the subtransactions 40 may take any desired format suitable to communicate which resource 30 is to be updated, and the particular updates to make against the resource 30. The transaction 38 includes, or may be accompanied by, a unique transaction ID 42.

The client application 16 inserts the transaction 38 into the TM queue 18. Any of the transaction managers 24 may be listening to the TM queue 18, and remove the transaction 38 from the TM queue 18. For purposes of illustration, it will be assumed that the transaction manager 24-1 removes the transaction 38 from the TM queue 18. The transaction manager 24-1 makes the transaction 38 durable by saving the transaction 38 into the transaction log 20.

In one example, the transaction manager 24-1 inserts the transaction 38 into a transaction log queue 22. The transaction processors 28-1-28-N listen to the transaction log queue 22 and repeatedly remove a transaction from the transaction log queue 22, process the transaction, and then remove and process another transaction. As a transaction processor 28 removes a transaction from the transaction log queue 22, the transaction may need to be acknowledged (ACKed) within a certain timeout period of time by the transaction processor 28 to confirm that the transaction was processed, or the transaction will automatically be placed back into the transaction log queue 22. In other examples, the transaction manager 24-1 may select one of the transaction processors 28-1-28-N and send the transaction 38 to the selected transaction processors 28-1-28-N for processing.

In this example, it will be assumed that the transaction processor 28-1 either receives the transaction 38 from the transaction manager 24-1 or removes the transaction 38 from the transaction log queue 22. The transaction processor 28-1 may have no knowledge regarding whether the transaction 38 has ever been processed before, or was previously partially processed due to a fault or other error. The transaction processor 28-1 accesses the transaction ID 42 and sends the transaction ID 42 to the resource manager 32-1 to determine the status of the subtransaction 40-1 with respect to the resource 30-1. The resource manager 32-1 responds to the transaction processor 28-1 with information that identifies the status of the subtransaction 40-1 with respect to the resource 30-1 as being either a not seen status, a prepared status, or a committed status.

The not seen status indicates that the resource manager 32-1 has completed no processing of the subtransaction 40-1. The prepared status indicates that the resource manager 32-1 has prepared the subtransaction 40-1, but has not yet committed the subtransaction 40-1 to the resource 30-1. The committed status means that the resource manager 32-1 has processed the subtransaction 40-1, has committed the subtransaction 40-1 to the resource 30-1, and that no further processing is necessary.

The status of a subtransaction is maintained by the resource manager 32-1 in the following manner. First, the resource manager 32-1 is requested to perform a subtransaction in a two-phase commit mode, or other consensus mode. The resource manager 32-1 processes the subtransaction, but does not save the results of the subtransaction initially. Upon receipt of a "prepare" command, the resource manager 32-1 then stores the results of the subtransaction in the prepared data structure 34-1, but does not update the resource 30-1. Upon receipt of a request to perform a "commit" operation, the resource manager 32-1 then saves the results of the subtransaction in the resource 30-1, stores the corresponding transaction ID in the committed data structure 36-1, and removes the subtransaction from the prepared data structure 34-1.

Accordingly, if a transaction ID is in neither the prepared data structure 34-1 nor the committed data structure 36-1, then the resource manager 32-1 returns the not seen status. If the transaction ID is in the prepared data structure 34-1, the resource manager 32-1 returns the prepared status. If the transaction ID is in the committed data structure 36-1, the resource manager 32-1 returns the committed status.

The three statuses provide a fine level of granularity that eliminates a need to perform work on the resource 30-1 that may have already been performed. For example, if the transaction processor 28-1 determines that the status of the subtransaction 40-1 is the prepared status, the transaction processor 28-1 need only request that a commit operation be performed against the resource 30-1. If the status of the subtransaction 40-1 is the committed status, the transaction processor 28-1 need not do any further processing.

The interaction between the transaction processor 28-1 and the resource manager 32-1 may take any of a number of different forms. In some examples, the transaction processor 28-1 may send the transaction ID 42 to the resource manager 32-1, and the resource manager 32-1 may access one or both of the prepared data structure 34-1 and the committed data structure 36-1 and determine the status. In other examples, the transaction processor 28-1 may query the committed data structure 36-1 to determine if the transaction ID 42 is in the committed data structure 36-1, and if not, query the prepared data structure 34-1 to determine if the subtransaction 40-1 has been prepared but not committed. In other examples, the transaction processor 28-1 may perform the processing identified in the subtransaction 40-1, and, if a constraint violation is returned, determine that the status is the committed status.

After processing the subtransaction 40-1, the transaction processor 28-1 sends the transaction ID 42 to the resource manager 32-2 to determine the status of the subtransaction 40-2 with respect to the resource 30-2. The resource manager 32-2 responds to the transaction processor 28-1 with information that identifies the status of the subtransaction 40-2 with respect to the resource 30-2 as being either a not seen status, a prepared status, or a committed status.

The transaction processor 28-1 performs appropriate processing against the resources 30-1, 30-2 via the resource managers 32-1, 32-2 respectively to bring the status of the subtransactions 40-1, 40-2 to the committed status. The transaction processor 28-1 then marks the transaction 38 as being completed so that the transaction 38 is not processed again by a transaction processor 28-1.

It is noted that many of the components discussed herein, such as the transaction processor 28, the transaction manager 24, the recovery manager 26, and the resource manager 32 may be implemented as components in a corresponding computing device. Thus, functionality implemented by any of such components may be attributed generally to a computing device. Moreover, in examples where such components are implemented via software instructions that program a processor device to carry out the functionality discussed herein, functionality implemented by such components may be attributed herein to a processor device.

Figure 2:
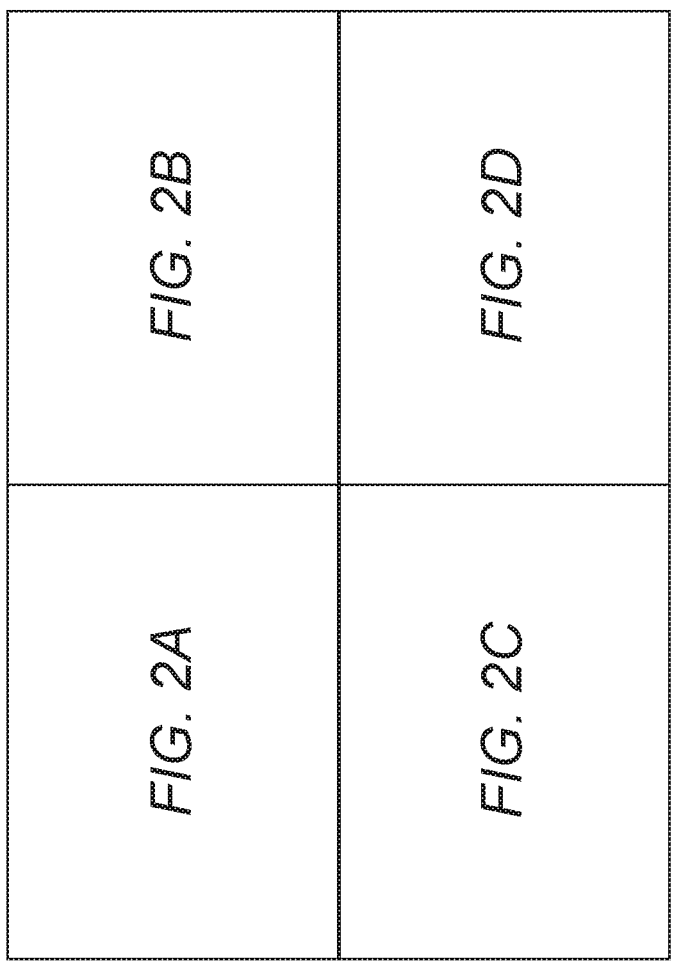
FIG. 2 is a legend illustrating the correspondence of FIGS. 2A, 2B, 2C, and 2D to one another.

FIG. 2 is a legend illustrating the correspondence of FIGS. 2A, 2B, 2C, and 2D to one another. FIGS. 2A, 2B, 2C, and 2D collectively form a message flow diagram illustrating processing associated with an atomic transaction in a consensus-based transaction model according to one example. A successful atomic transaction is illustrated in FIGS. 2A-2D, with several "crash" points noted to indicate where a transaction processor 28 could fault, or otherwise terminate unexpectedly, prior to completion of the transaction. Recovery processing by a subsequent transaction processor 28 that would occur in the event of such a fault at the corresponding crash points is discussed in FIGS. 3, 4, 5, and 6. In each of FIGS. 2-7, circled capitalized letters are depicted to show continuity between the multiple sheets of each figure.

Figure 2A:
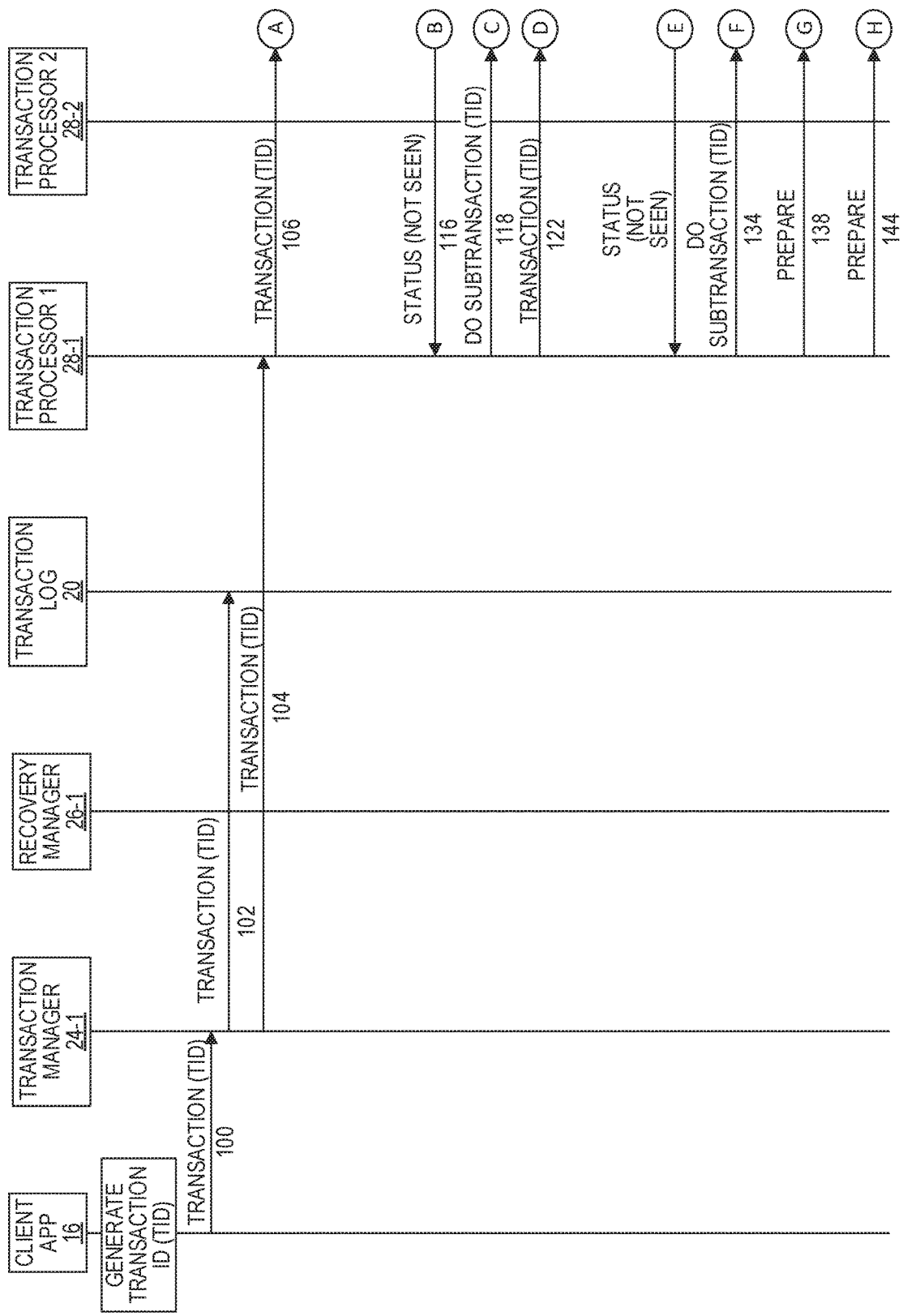
FIGS. 2A, 2B, 2C, and 2D collectively form a message flow diagram illustrating processing associated with an atomic transaction in a consensus-based transaction model according to one example.
Figure 2B:
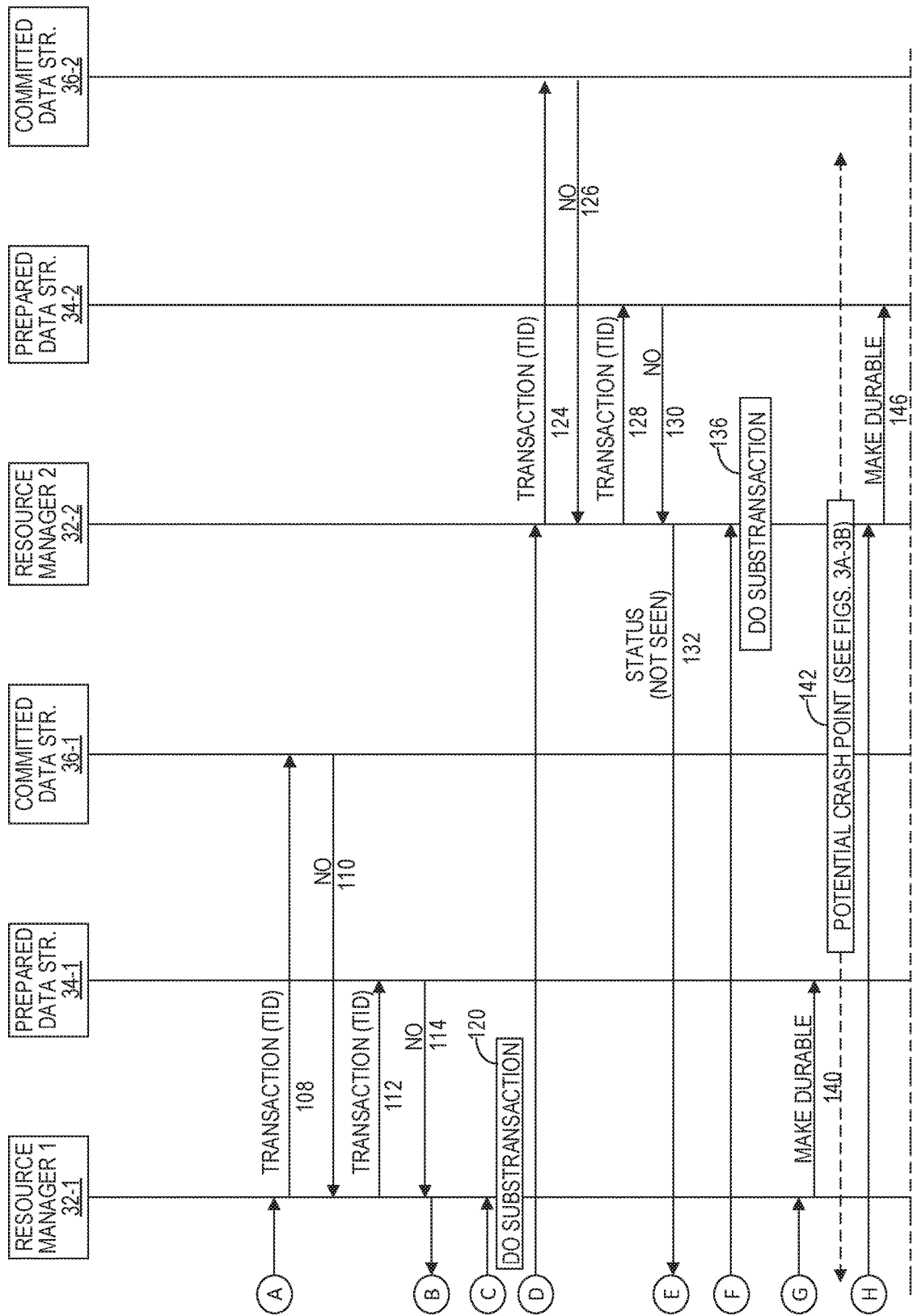

Referring to FIGS. 2A-2B, the client application 16 generates the transaction 38 and the unique transaction ID 42, and, in this example, sends the transaction 38 and the unique transaction ID 42 to the transaction manager 24-1 (step 100). The transaction manager 24-1 stores the transaction 38 and the unique transaction ID 42 in the transaction log 20 (step 102). The transaction manager 24-1 selects the transaction processor 28-1, and sends the transaction 38 and the unique transaction ID 42 to the transaction processor 28-1 (step 104). As noted above with regard to FIG. 1, in other examples the transaction manager 24-1 may receive the transaction 38 and the unique transaction ID 42 via the TM queue 18, and may then insert the transaction 38 and the unique transaction ID 42 into the transaction log queue 22 for processing by a transaction processor 28.

The transaction processor 28-1 analyzes the transaction 38 and determines that the transaction 38 contains the first subtransaction 40-1, containing updates for the resource 30-1, and the second subtransaction 40-2, containing updates for the resource 30-2. The transaction processor 28-1 sends the transaction ID 42 to the resource manager 32-1 to obtain the status of the first subtransaction 40-1 with respect to the resource 30-1 (step 106). In this example, determining the status is handled by the resource manager 32-1. In particular, the resource manager 32-1 accesses the committed data structure 36-1 with the transaction ID 42 to determine if previously the subtransaction 40-1 had been committed to the resource 30-1 (step 108). In this example, the resource manager 32-1 determines that the transaction ID 42 is not in the committed data structure 36-1, and thus that the subtransaction 40-1 had not previously been committed to the resource 30-1 (step 110).

The resource manager 32-1 then accesses the prepared data structure 34-1 with the transaction ID 42 to determine if previously the subtransaction 40-1 had been prepared for the resource 30-1 (step 112). In this example, the resource manager 32-1 determines that the transaction ID 42 is not in the prepared data structure 34-1, and thus that the subtransaction 40-1 had not previously been prepared for the resource 30-1 (step 114). Because the transaction 38 had not been committed or prepared, the resource manager 32-1 sends the transaction processor 28-1 a message indicating that the status of the subtransaction 40-1 is not seen (step 116).

In other examples, the transaction processor 28-1 may perform some of the processing discussed above with regard to the resource manager 32-1. In particular, the transaction processor 28-1 may send the resource manager 32-1 a request that includes a query of the committed data structure 36-1 using the transaction ID 42. If the result of the query is that the transaction ID 42 is not in the committed data structure 36-1, the transaction processor 28-1 determines that the subtransaction 40-1 has not been committed to the resource 30-1. The transaction processor 28-1 may then send the resource manager 32-1 a request that includes a query of the prepared data structure 34-1 using the transaction ID 42. If the result of the query is that the transaction ID 42 is not in the prepared data structure 34-1, the transaction processor 28-1 determines that the subtransaction 40-1 has not been prepared for the resource 30-1. Since the subtransaction 40-1 has not been committed, and has not been prepared, the transaction processor 28-1 determines that the status of the subtransaction 40-1 is not seen.

In response to determining that the status of the subtransaction 40-1 is not seen, the transaction processor 28-1 implements the subtransaction 40-1 against the resource 30-1 (steps 118-120). This may involve, for example, sending the subtransaction 40-1 to the resource manager 32-1, or may involve the transaction processor 28-1 performing various query and update commands against the resource 30-1 via the resource manager 32-1 based on the contents of the subtransaction 40-1. If the resource manager 32-1 was not already in a two-phase commit mode, the processing may involve placing the resource 30-1 in the two-phase commit mode via appropriate messaging with the resource manager 32-1.

The transaction processor 28-1 then performs the same processing in conjunction with the resource manager 32-2 for the subtransaction 40-2 (steps 122-136). At this point, both the subtransactions 40-1 and 40-2 have been performed against the resources 30-1, 30-2, respectively, but have not been prepared, or committed, and thus are not visible to any other users of the resources 30-1, 30-2.

The transaction processor 28-1 directs the resource manager 32-1 to prepare the subtransaction 40-1 (step 138). The resource manager 32-1 stores the results of the subtransaction 40-1 in the prepared data structure 34-1, making the subtransaction 40-1 "durable" (i.e., saved), and thereby placing the subtransaction 40-1 in the prepared state (step 140).

A potential crash point 142 of the transaction processor 28-1 is noted at this point. The crash point 142 represents a point in time after the subtransaction 40-1 has been prepared, but before the subtransaction 40-2 has been prepared. Subsequent processing of the transaction 38 in the event of a fault in the transaction processor 28-1 at this point in time will be discussed with regard to FIG. 4, below.

Assuming no such fault at potential crash point 142 occurred, the transaction processor 28-1 directs the resource manager 32-2 to prepare the subtransaction 40-2 (step 144). The resource manager 32-2 stores the results of the subtransaction 40-2 in the prepared data structure 34-2, making the subtransaction 40-2 "durable" (i.e., saved), and thereby placing the subtransaction 40-2 in the prepared state (step 146).

Figure 2C:
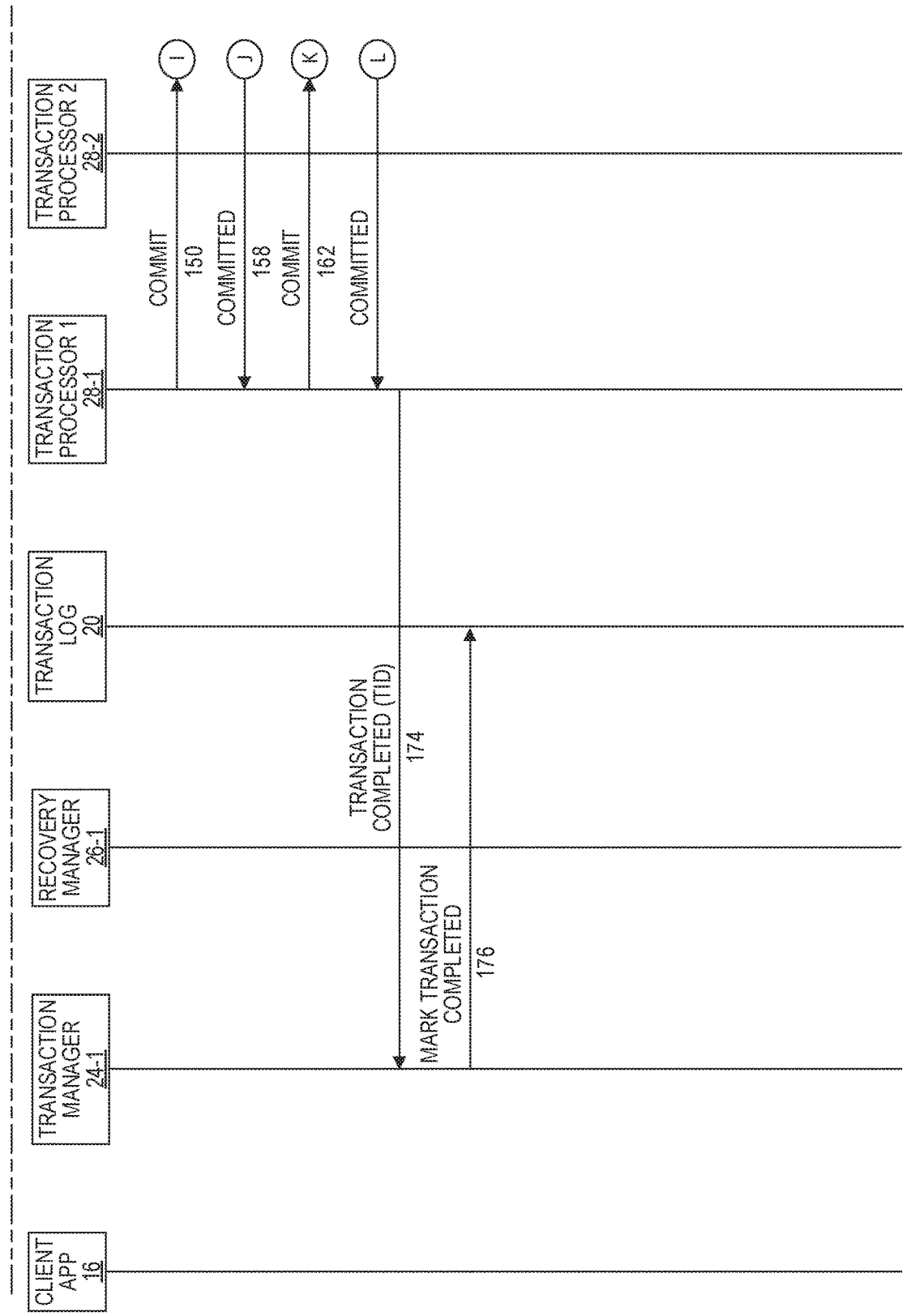
Figure 2D:
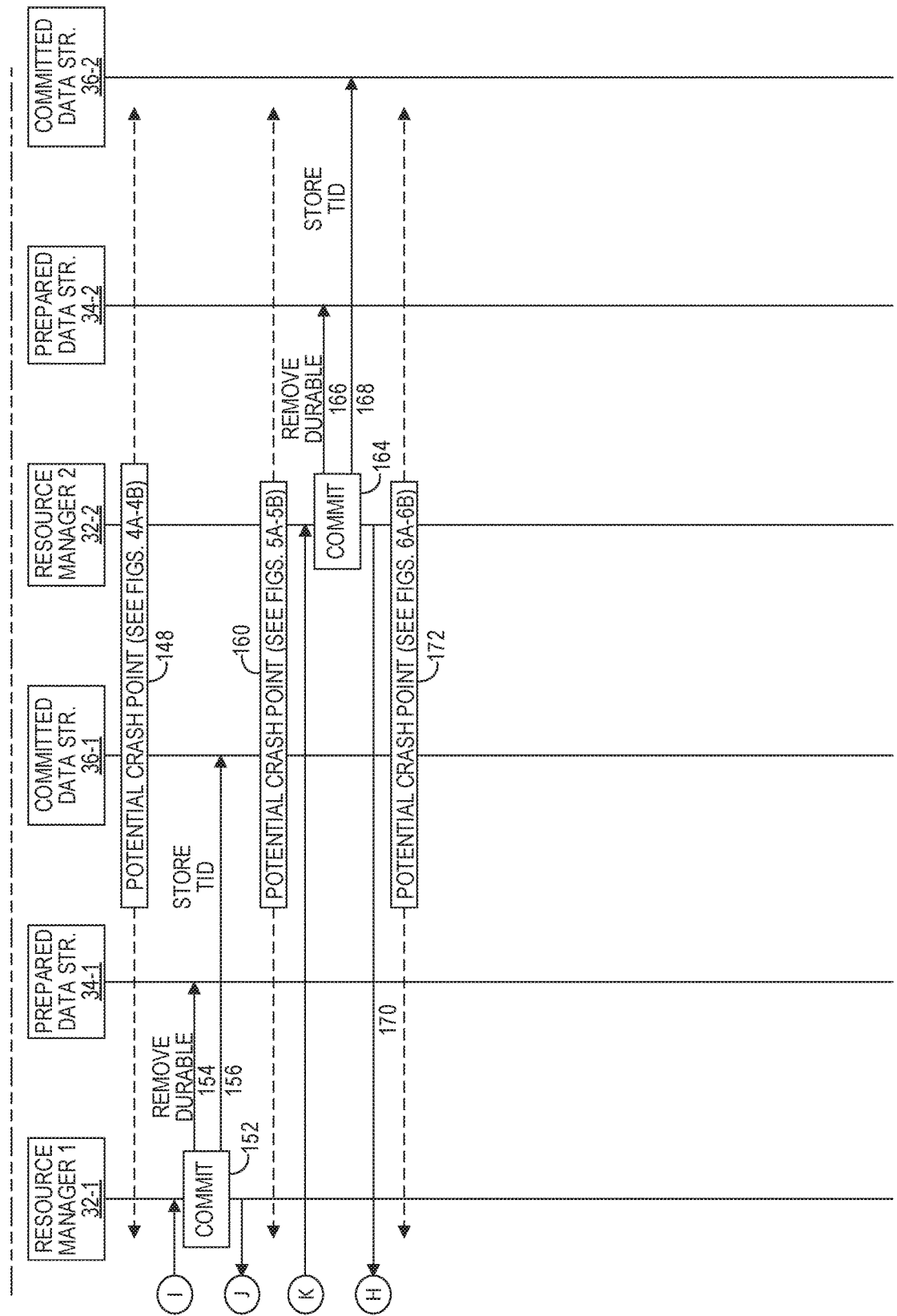

Referring now to FIGS. 2C-2D, a potential crash point 148 of the transaction processor 28-1 is noted at this point. The crash point 148 represents a point in time after the subtransactions 40-1 and 40-2 have prepared, but before either subtransactions 40-1 or 40-2 have been committed. Subsequent processing of the transaction 38 in the event of a fault in the transaction processor 28-1 at this point in time will be discussed with regard to FIG. 4, below.

Assuming no such fault at potential crash point 148 occurred, the transaction processor 28-1 directs the resource manager 32-1 to commit the subtransaction 40-1 (step 150). The resource manager 32-1 commits the subtransaction 40-1 to the resource 30-1, making the updates to the resource 30-1 visible to other users of the resource 30-1 (step 152). The commit step also involves removing the subtransaction 40-1 from the prepared data structure 34-1, and storing the transaction ID 42 in the committed data structure 36-1 (steps 154, 156), thereby putting the subtransaction 40-1 in the committed state. The resource manager 32-1 confirms that the subtransaction 40-2 has been committed (step 158).

A potential crash point 160 of the transaction processor 28-1 is noted at this point. The crash point 160 represents a point in time after the subtransaction 40-1 has been committed, but before the subtransaction 40-2 has been committed. Subsequent processing of the transaction 38 in the event of a fault in the transaction processor 28-1 at this point in time will be discussed with regard to FIG. 5, below.

Assuming no such fault at potential crash point 160 occurred, the transaction processor 28-1 directs the resource manager 32-2 to commit the subtransaction 40-2 (step 162). The resource manager 32-2 commits the subtransaction 40-2 to the resource 30-2, making the updates to the resource 30-2 visible to other users of the resource 30-2 (step 164). The commit step also involves removing the subtransaction 40-2 from the prepared data structure 34-2 and storing the transaction ID 42 in the committed data structure 36-2 (steps 164, 166), thereby putting the subtransaction 40-2 in the committed state. The resource manager 32-2 confirms that the subtransaction 40-2 has been committed (step 170).

A potential crash point 172 of the transaction processor 28-1 is noted at this point. The crash point 172 represents a point in time after the subtransactions 40-1 and 40-2 have been committed, but before the transaction 38 has been marked as being completed. Subsequent processing of the transaction 38 in the event of a fault in the transaction processor 28-1 at this point in time will be discussed with regard to FIG. 6, below.

Assuming no such fault at potential crash point 172 occurred, the transaction processor 28-1 informs the transaction manager 24-1 that the transaction 38 has been completed (step 174). The transaction manager 24-1 marks the transaction 38 in the transaction log 20 as being completed so that no other transaction processor 28 will attempt to process the transaction 38, and so that a subsequent garbage collection process can remove the transaction 38 from the transaction log 20, as well as the transaction ID 42 from the committed data structures 36-1, 36-2, as discussed in greater detail with regard to FIGS. 7A-7B (step 176).

Figure 3A:
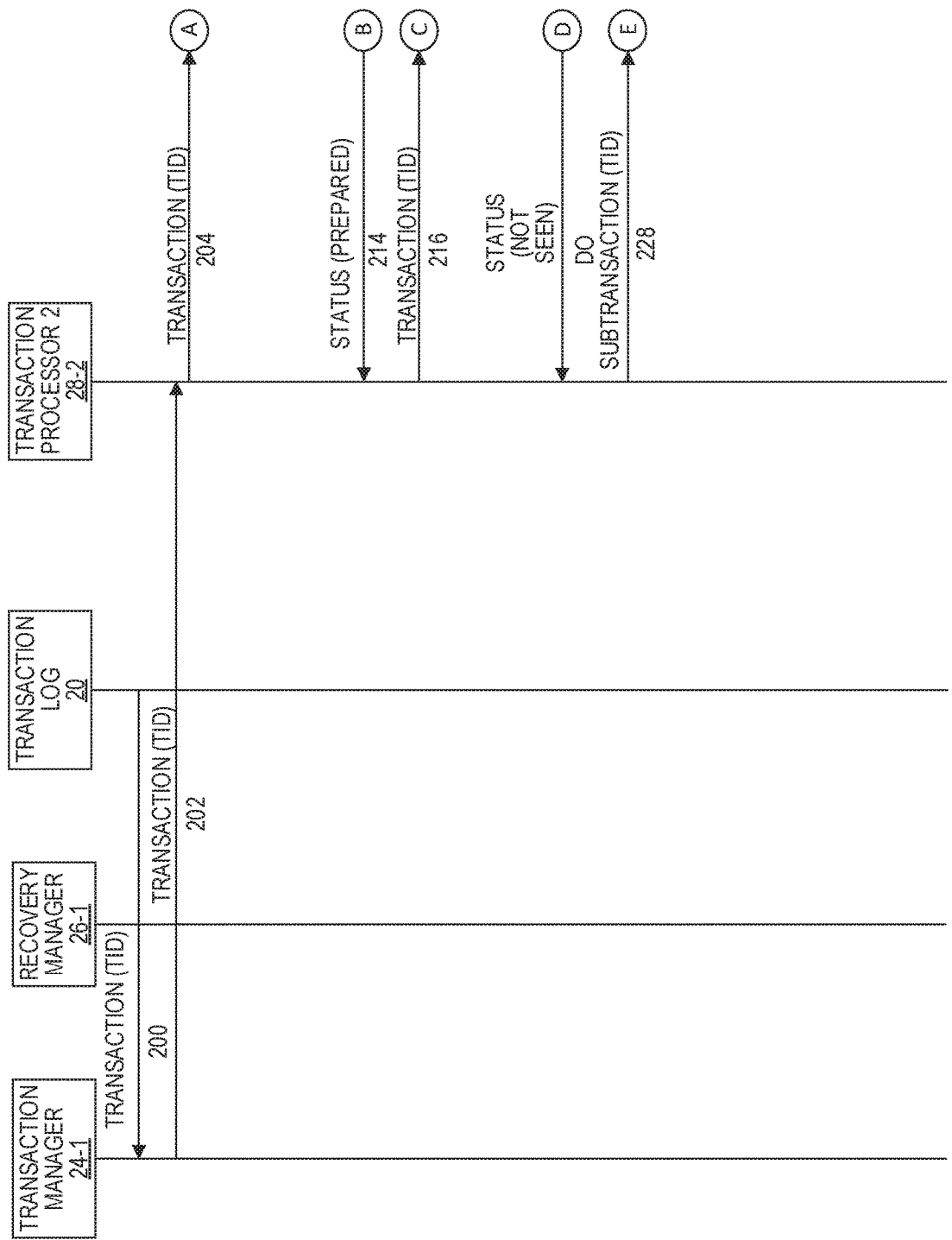
FIGS. 3A-3B illustrate transaction recovery processing that may occur if a transaction processor had faulted at a particular location during the processing illustrated in FIGS. 2A-2D.
Figure 3B:
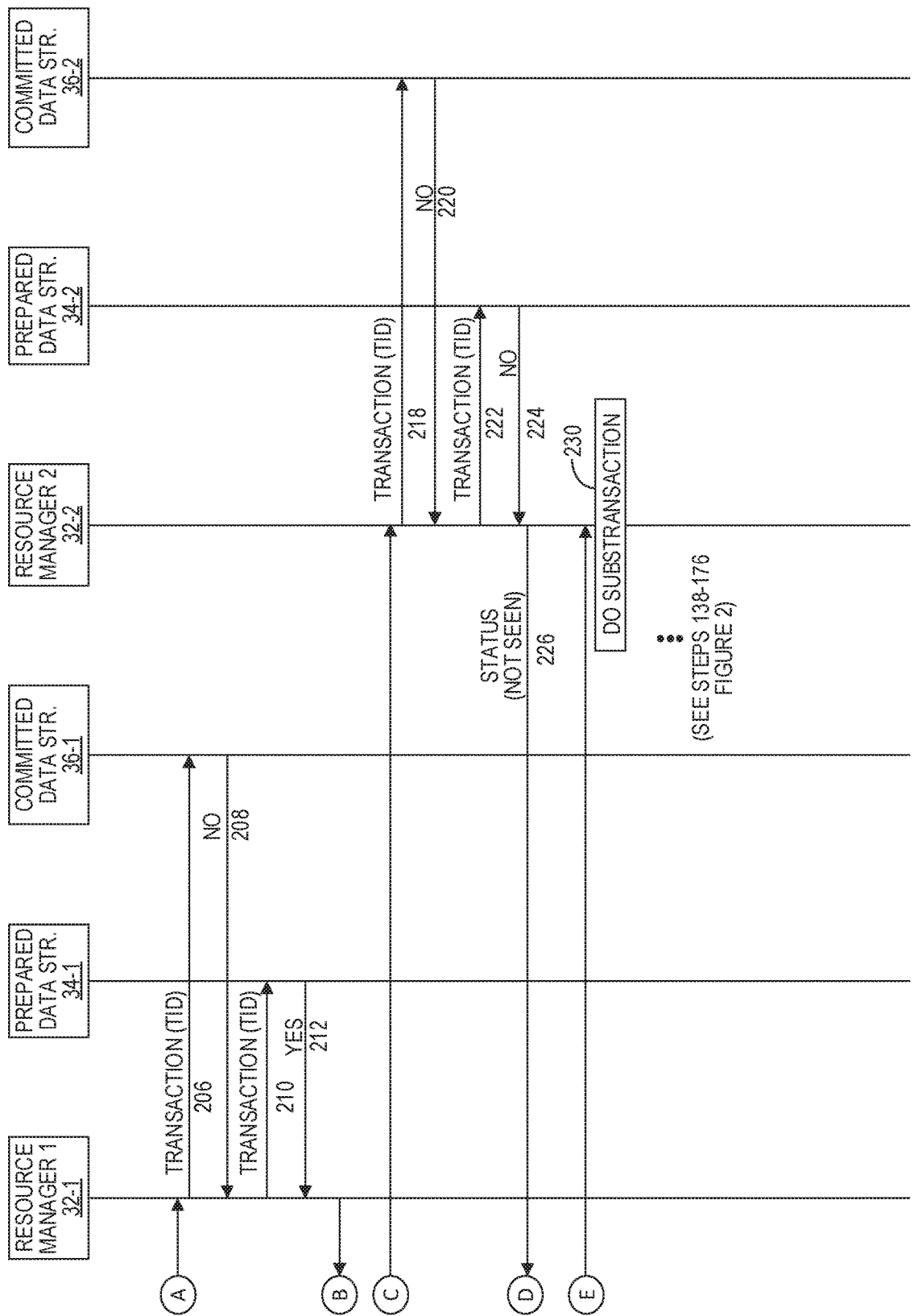

FIGS. 3A-3B illustrate transaction recovery processing that may occur if the transaction processor 28-1 had faulted at the crash point 142 of FIGS. 2A-2D. In this example, the transaction manager 24-1 retrieves the transaction 38 from the transaction log 20 (step 200).

The transaction manager 24-1 sends the transaction 38 and the transaction ID 42 to the transaction processor 28-2 (step 202). Note that the transaction processor 28-2 has never processed the transaction 38 before, nor is aware that the transaction processor 28-1 partially processed the transaction 38, as discussed with regard to FIG. 2 above. The transaction processor 28-2 sends the transaction ID 42 to the resource manager 32-1 to obtain the status of the first subtransaction 40-1 with respect to the resource 30-1 (step 204). In this example, determining the status is handled by the resource manager 32-1. The resource manager 32-1 accesses the committed data structure 36-1 with the transaction ID 42 to determine if previously the subtransaction 40-1 had been committed to the resource 30-1 (step 206). In this example, the resource manager 32-1 determines that the transaction ID 42 is not in the committed data structure 36-1, and thus that the subtransaction 40-1 had not previously been committed to the resource 30-1 (step 208).

The resource manager 32-1 then accesses the prepared data structure 34-1 with the transaction ID 42 to determine if previously the subtransaction 40-1 had been prepared for the resource 30-1 (step 210). In this example, the resource manager 32-1 determines that the transaction ID 42 is in the prepared data structure 34-1, and thus that the subtransaction 40-1 had previously been prepared for the resource 30-1 (step 212). Because the transaction 38 had previously been prepared, the resource manager 32-1 sends the transaction processor 28-1 a message indicating that the status of the subtransaction 40-1 is prepared (step 214). Because the status of the subtransaction 40-1 is prepared, the transaction processor 28-2 need not resubmit the subtransaction 40-1 to the resource manager 32-1.

The transaction processor 28-2 sends the transaction ID 42 to the resource manager 32-2 to obtain the status of the second subtransaction 40-2 with respect to the resource 30-2 (step 216). The resource manager 32-2 accesses the committed data structure 36-2 and the prepared data structure 34-1, and determines that the status of the second subtransaction 40-2 is not seen (steps 218-226). In response to determining that the status of the subtransaction 40-2 is not seen, the transaction processor 28-2 implements the subtransaction 40-2 against the resource 30-2 (steps 228-230). The remaining of the processing, assuming no fault occurs, mirrors that of steps 138-176 of FIG. 2, and are not repeated herein for the sake of brevity.

Figure 4A:
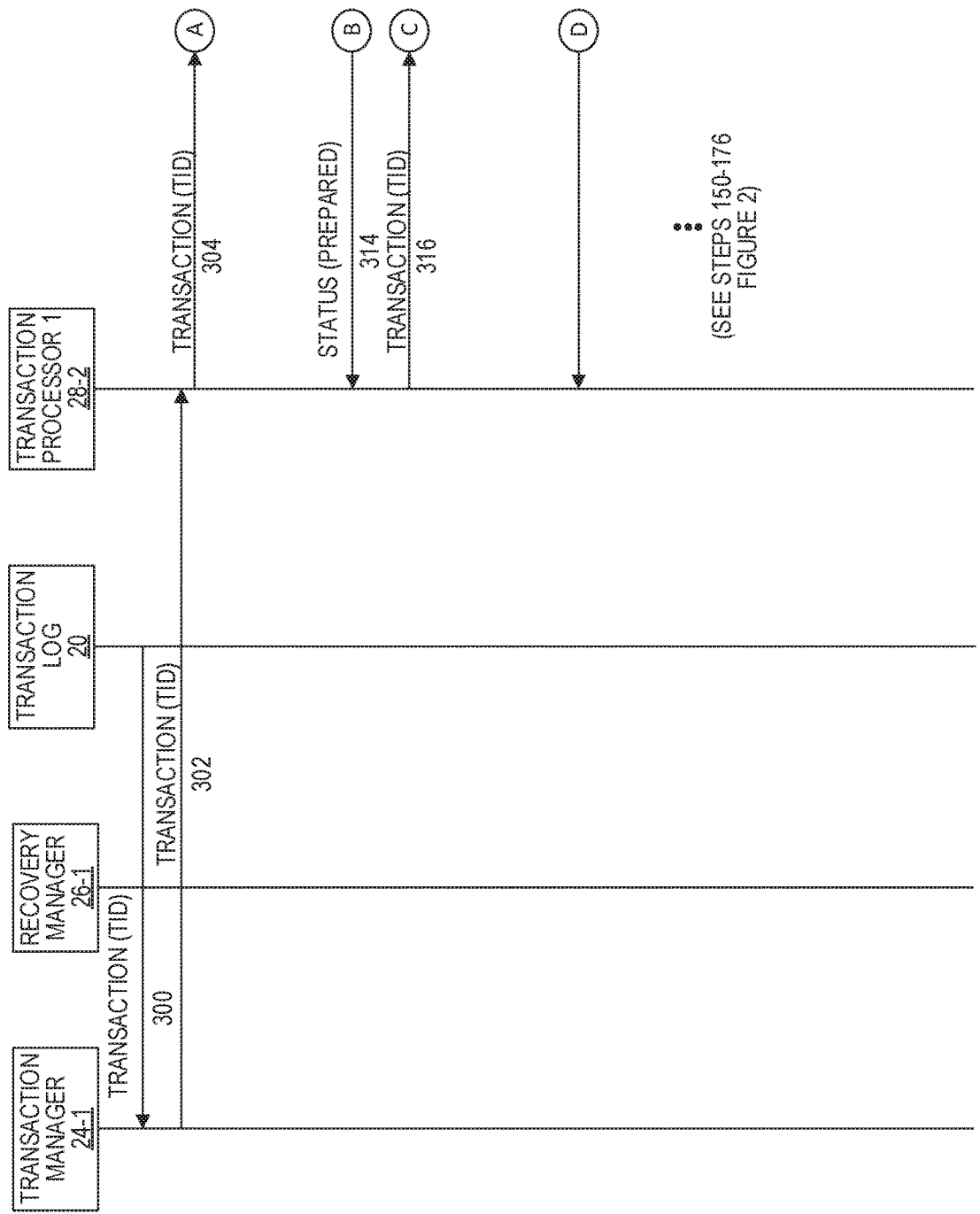
FIGS. 4A-4B illustrate transaction recovery processing that may occur if the transaction processor had faulted at another location during the processing illustrated in FIGS. 2A-2D.
Figure 4B:
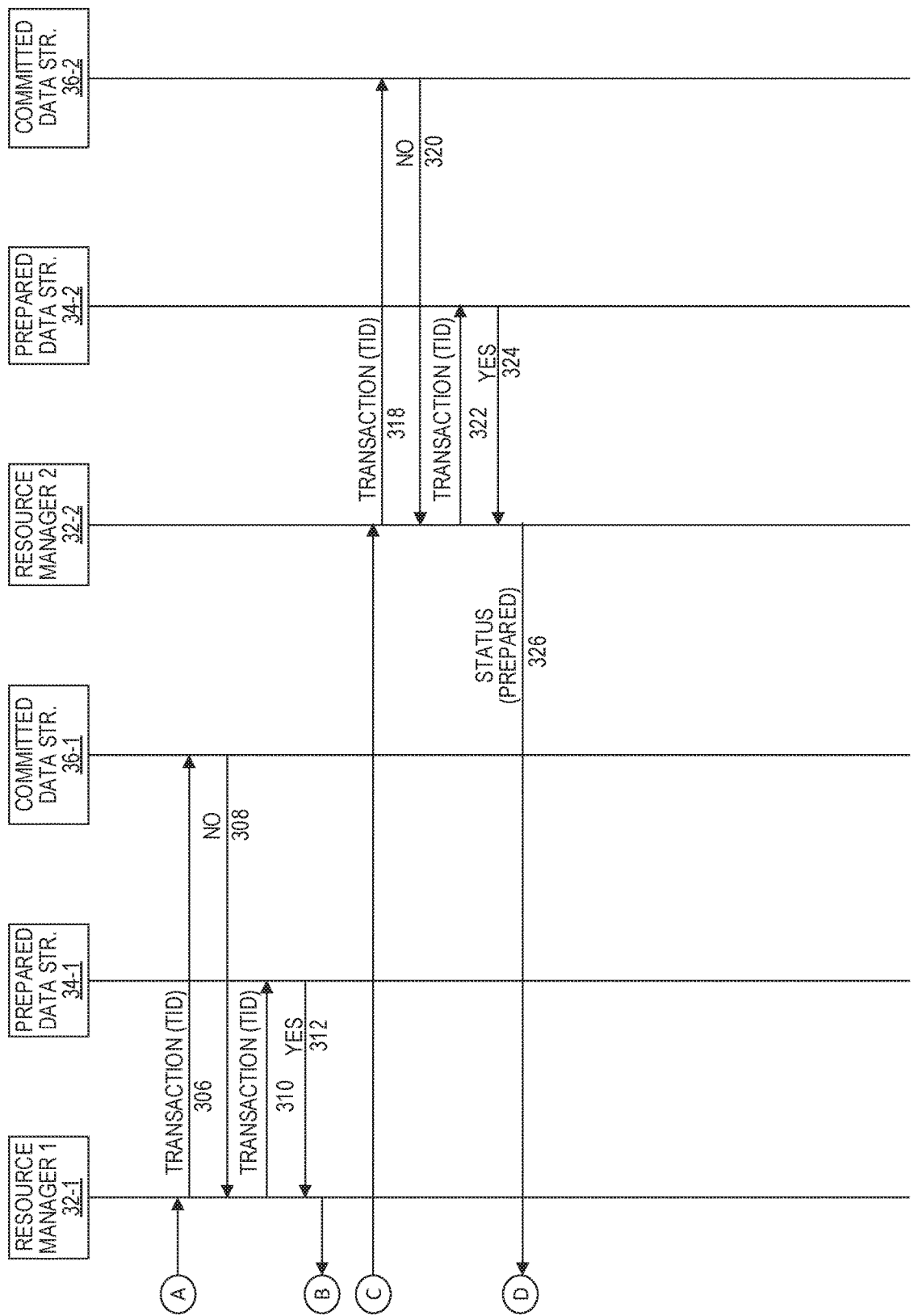

FIGS. 4A-4B illustrate transaction recovery processing that may occur if the transaction processor 28-1 had faulted at the crash point 148 of FIGS. 2A-2D. In this example, the transaction manager 24-1 retrieves the transaction 38 from the transaction log 20 (step 300). The transaction manager 24-1 sends the transaction 38 and the transaction ID 42 to the transaction processor 28-2 (step 302). Note again that the transaction processor 28-2 has never processed the transaction 38 before, nor is aware that the transaction processor 28-1 partially processed the transaction 38, as discussed with regard to FIG. 2 above. The transaction processor 28-2 sends the transaction ID 42 to the resource manager 32-1 to obtain the status of the first subtransaction 40-1 with respect to the resource 30-1 (step 304). In this example, determining the status is handled by the resource manager 32-1.

The resource manager 32-1 accesses the committed data structure 36-1 with the transaction ID 42 to determine if previously the subtransaction 40-1 had been committed to the resource 30-1 (step 306). In this example, the resource manager 32-1 determines that the transaction ID 42 is not in the committed data structure 36-1, and thus that the subtransaction 40-1 had not previously been committed to the resource 30-1 (step 308).

The resource manager 32-1 then accesses the prepared data structure 34-1 with the transaction ID 42 to determine if previously the subtransaction 40-1 had been prepared for the resource 30-1 (step 310). In this example, the resource manager 32-1 determines that the transaction ID 42 is in the prepared data structure 34-1, and thus that the subtransaction 40-1 had previously been prepared for the resource 30-1 (step 312). Because the transaction 38 had previously been prepared, the resource manager 32-1 sends the transaction processor 28-1 a message indicating that the status of the subtransaction 40-1 is prepared (step 314). Because the status of the subtransaction 40-1 is prepared, the transaction processor 28-2 need not resubmit the subtransaction 40-1 to the resource manager 32-1.

The transaction processor 28-2 sends the transaction ID 42 to the resource manager 32-2 to obtain the status of the second subtransaction 40-2 with respect to the resource 30-2 (step 316). The resource manager 32-2 accesses the committed data structure 36-2 and the prepared data structure 34-1, and determines that the status of the second subtransaction 40-2 is also prepared (steps 318-326). Because the status of the subtransaction 40-2 is prepared, the transaction processor 28-2 need not resubmit the subtransaction 40-2 to the resource manager 32-2. The remaining of the processing, assuming no fault occurs, mirrors that of steps 150-176 of FIG. 2, and are not repeated herein for the sake of brevity.

Figure 5A:
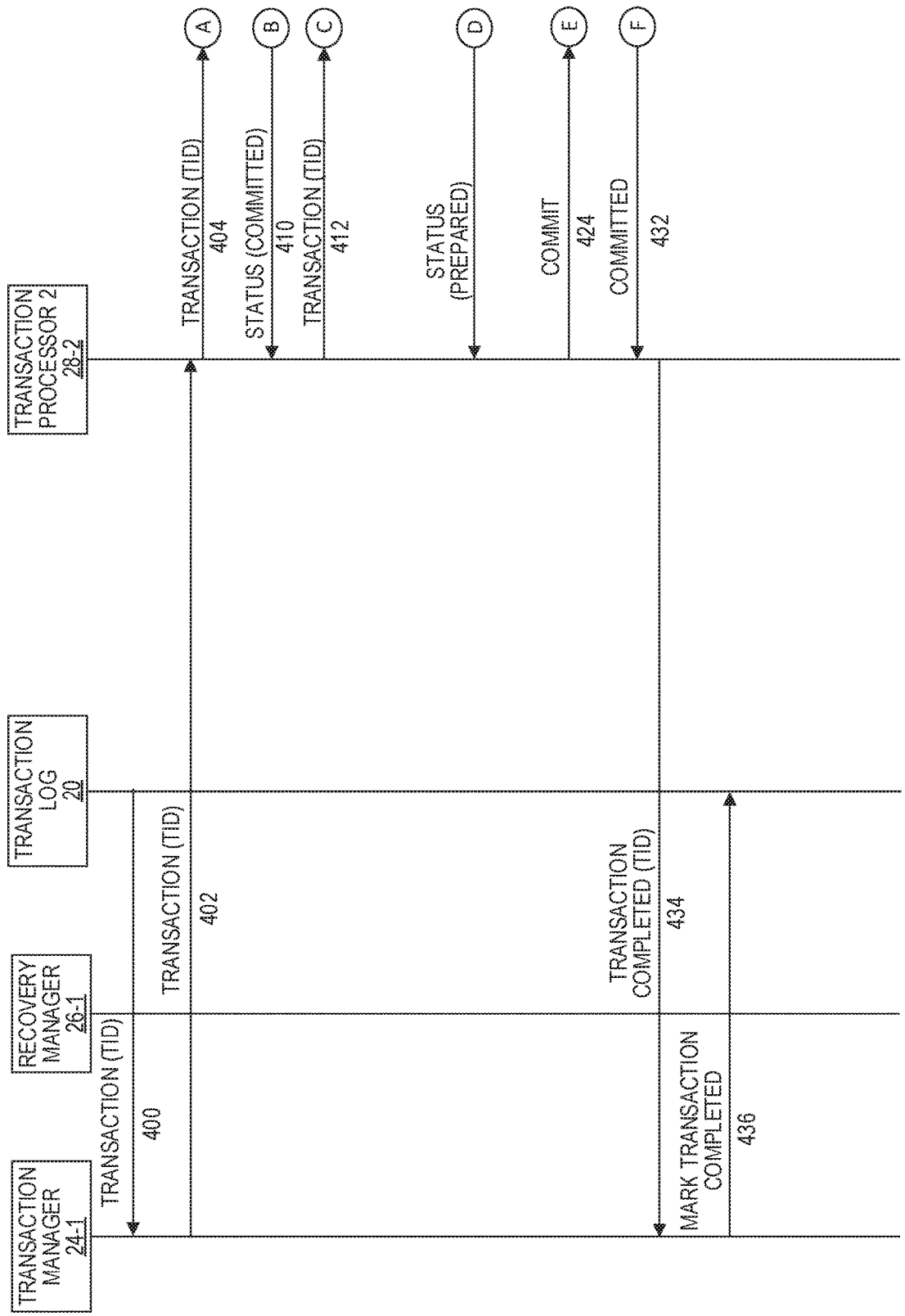
FIGS. 5A-5B illustrate transaction recovery processing that may occur if the transaction processor had faulted at another location during the processing illustrated in FIGS. 2A-2D.
Figure 5B:
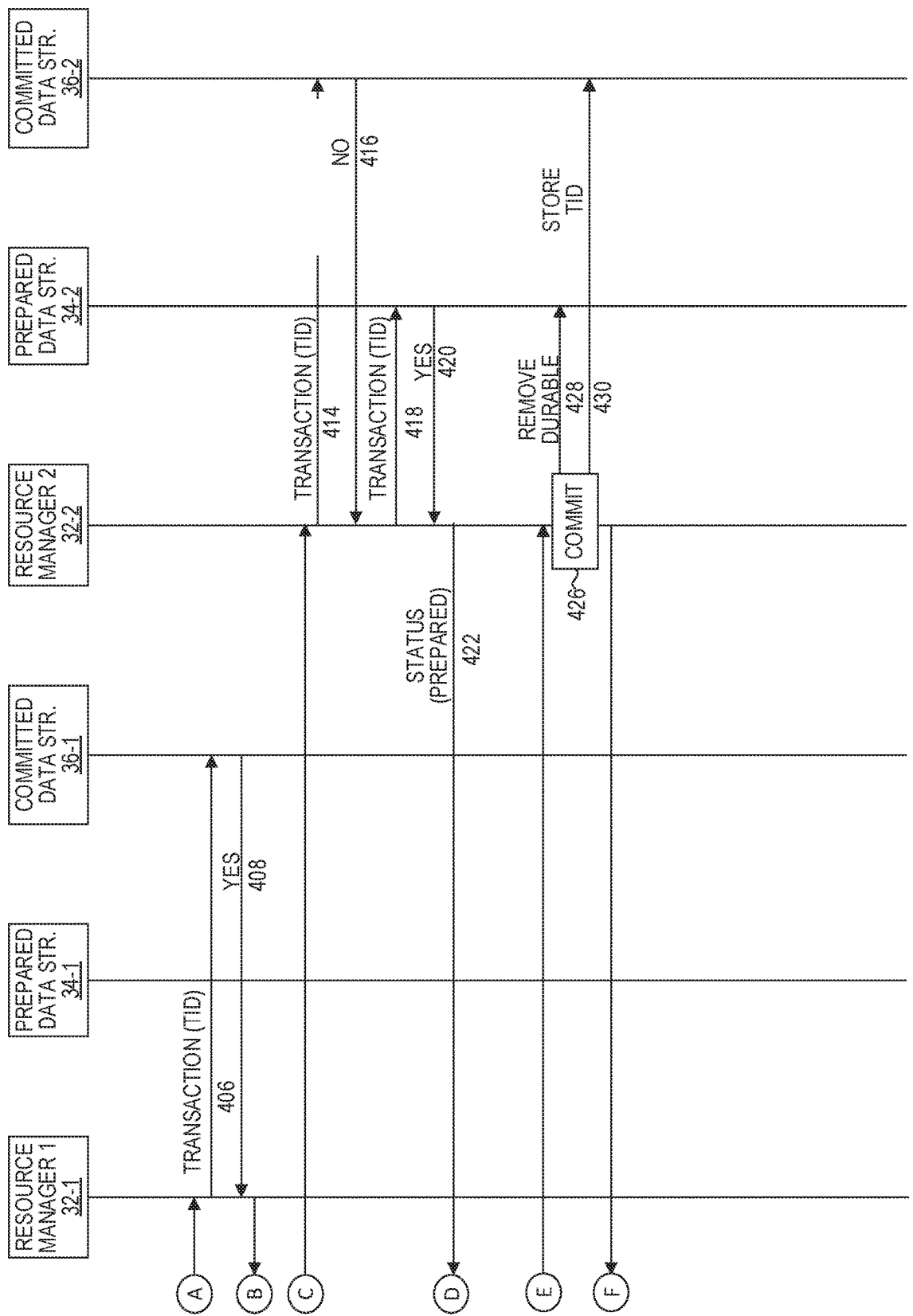

FIGS. 5A-5B illustrate transaction recovery processing that may occur if the transaction processor 28-1 had faulted at the crash point 160 of FIGS. 2A-2D. In this example, the transaction manager 24-1 retrieves the transaction 38 from the transaction log 20 (step 400). The transaction manager 24-1 sends the transaction 38 and the transaction ID 42 to the transaction processor 28-2 (step 402). Note again that the transaction processor 28-2 has never processed the transaction 38 before, nor is aware that the transaction processor 28-1 partially processed the transaction 38, as discussed with regard to FIG. 2 above. The transaction processor 28-2 sends the transaction ID 42 to the resource manager 32-1 to obtain the status of the first subtransaction 40-1 with respect to the resource 30-1 (step 404). In this example, determining the status is handled by the resource manager 32-1.

The resource manager 32-1 accesses the committed data structure 36-1 with the transaction ID 42 to determine if previously the subtransaction 40-1 had been committed to the resource 30-1 (step 406). In this example, the resource manager 32-1 determines that the transaction ID 42 is in the committed data structure 36-1, and thus that the subtransaction 40-1 had previously been committed to the resource 30-1 (step 408). The resource manager 32-1 sends the transaction processor 28-1 a message indicating that the status of the subtransaction 40-1 is committed (step 410). Because the status of the subtransaction 40-1 is committed, the transaction processor 28-2 need not do any further processing with respect to the subtransaction 40-1.

The transaction processor 28-2 sends the transaction ID 42 to the resource manager 32-2 to obtain the status of the second subtransaction 40-2 with respect to the resource 30-2 (step 412). The resource manager 32-2 accesses the committed data structure 36-2 and the prepared data structure 34-2, and determines that the status of the second subtransaction 40-2 is prepared (steps 414-422). Because the status of the subtransaction 40-2 is prepared, the transaction processor 28-2 need not resubmit the subtransaction 40-2 to the resource manager 32-2.

The transaction processor 28-2 directs the resource manager 32-2 to commit the subtransaction 40-2 (step 424). The resource manager 32-2 commits the subtransaction 40-2 to the resource 30-2, making the updates to the resource 30-2 visible to other users of the resource 30-2 (step 426). The commit step also involves removing the subtransaction 40-2 from the prepared data structure 34-2 and storing the transaction ID 42 in the committed data structure 36-2 (steps 428, 430), thereby putting the subtransaction 40-2 in the committed state. The resource manager 32-2 confirms that the subtransaction 40-2 has been committed (step 432). The transaction processor 28-2 informs the transaction manager 24-1 that the transaction 38 has been completed (step 434). The transaction manager 24-1 marks the transaction 38 in the transaction log 20 as being completed so that no other transaction processor 28 will attempt to process the transaction 38 (step 436).

Figure 6A:
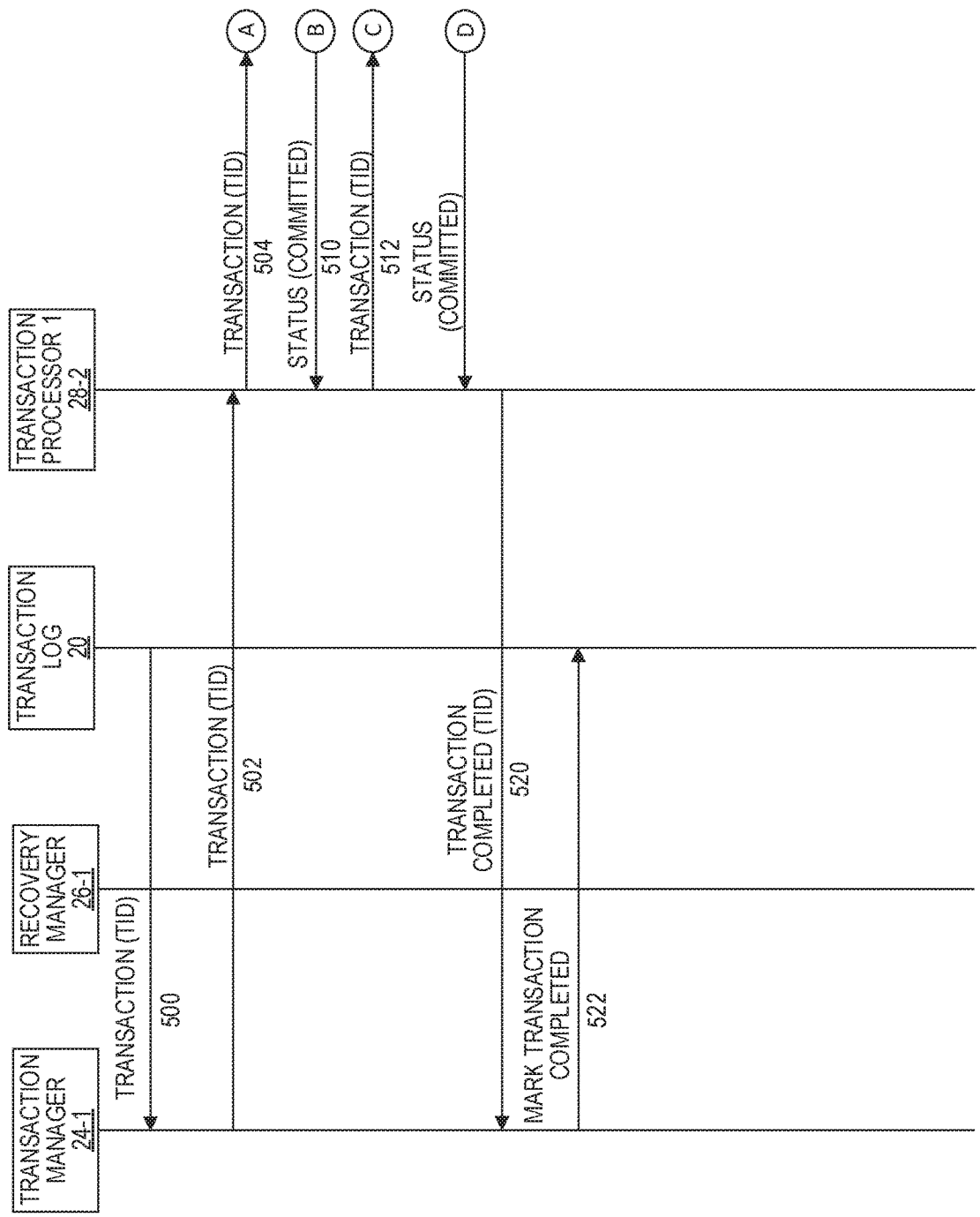
FIGS. 6A-6B illustrate transaction recovery processing that may occur if the transaction processor had faulted at another location during the processing illustrated in FIGS. 2A-2D.
Figure 6B:
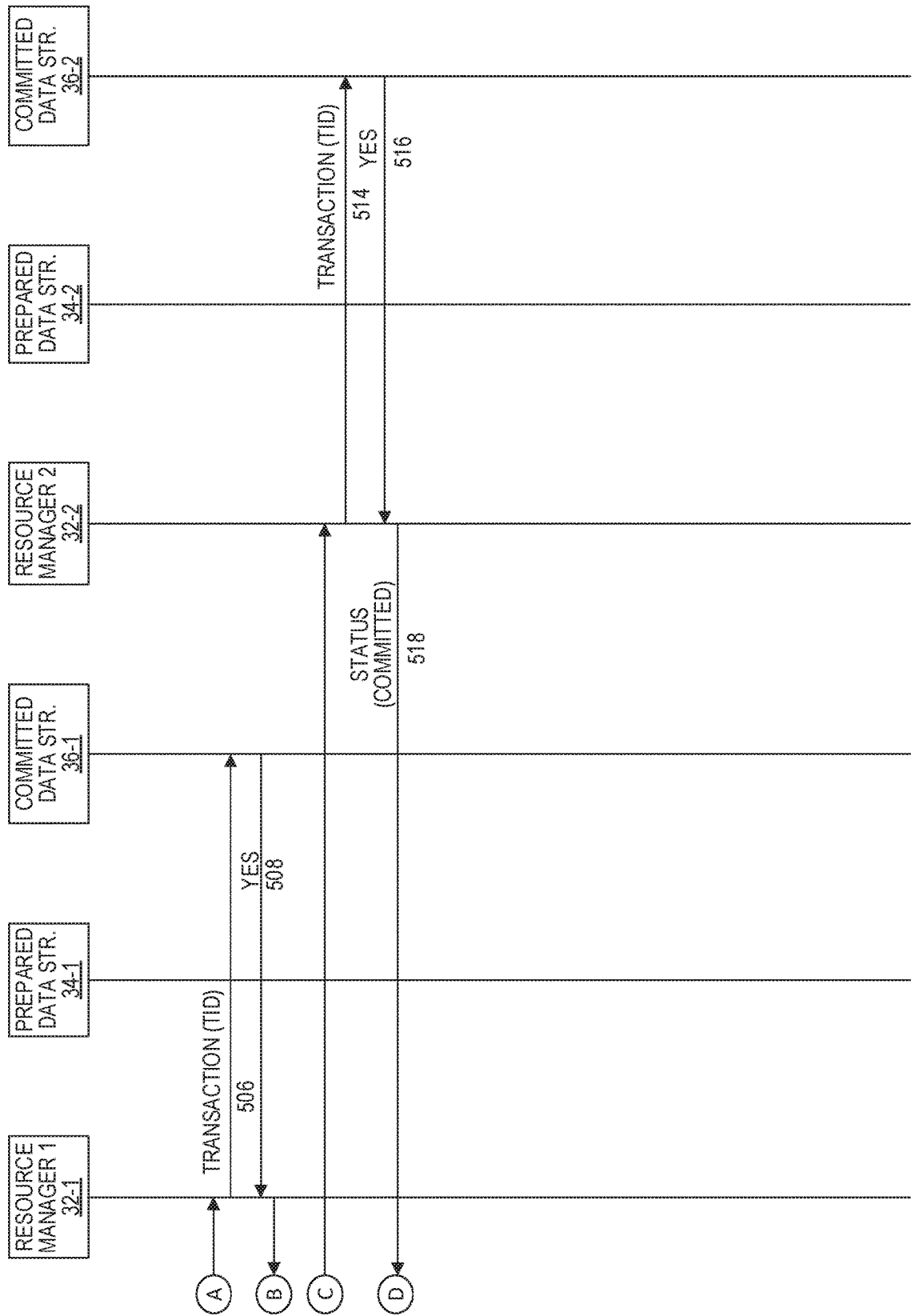

FIGS. 6A-6B illustrate transaction recovery processing that may occur if the transaction processor 28-1 had faulted at the crash point 172 of FIGS. 2A-2D. In this example, the transaction manager 24-1 retrieves the transaction 38 from the transaction log 20 (step 500). The transaction manager 24-1 sends the transaction 38 and the transaction ID 42 to the transaction processor 28-2 (step 502). The transaction processor 28-2 sends the transaction ID 42 to the resource manager 32-1 to obtain the status of the first subtransaction 40-1 with respect to the resource 30-1 (step 504). The resource manager 32-1 accesses the committed data structure 36-1 with the transaction ID 42 to determine if previously the subtransaction 40-1 had been committed to the resource 30-1 (step 506). In this example, the resource manager 32-1 determines that the transaction ID 42 is in the committed data structure 36-1, and thus that the subtransaction 40-1 had previously been committed to the resource 30-1 (step 508). The resource manager 32-1 sends the transaction processor 28-1 a message indicating that the status of the subtransaction 40-1 is committed (step 510). Because the status of the subtransaction 40-1 is committed, the transaction processor 28-2 need not do any further processing with respect to the subtransaction 40-1.

The transaction processor 28-2 sends the transaction ID 42 to the resource manager 32-2 to obtain the status of the first subtransaction 40-2 with respect to the resource 30-2 (step 512). The resource manager 32-2 accesses the committed data structure 36-2 with the transaction ID 42 to determine if previously the subtransaction 40-2 had been committed to the resource 30-2 (step 514). In this example, the resource manager 32-2 determines that the transaction ID 42 is in the committed data structure 36-2, and thus that the subtransaction 40-2 had previously been committed to the resource 30-2 (step 516). The resource manager 32-2 sends the transaction processor 28-2 a message indicating that the status of the subtransaction 40-1 is committed (step 518). Because the status of the subtransaction 40-1 is committed, the transaction processor 28-2 need not do any further processing with respect to the subtransaction 40-1. The transaction processor 28-2 informs the transaction manager 24-1 that the transaction 38 has been completed (step 520). The transaction manager 24-1 marks the transaction 38 in the transaction log 20 as being completed so that no other transaction processor 28 will attempt to process the transaction 38 (step 522).

Figure 7A:
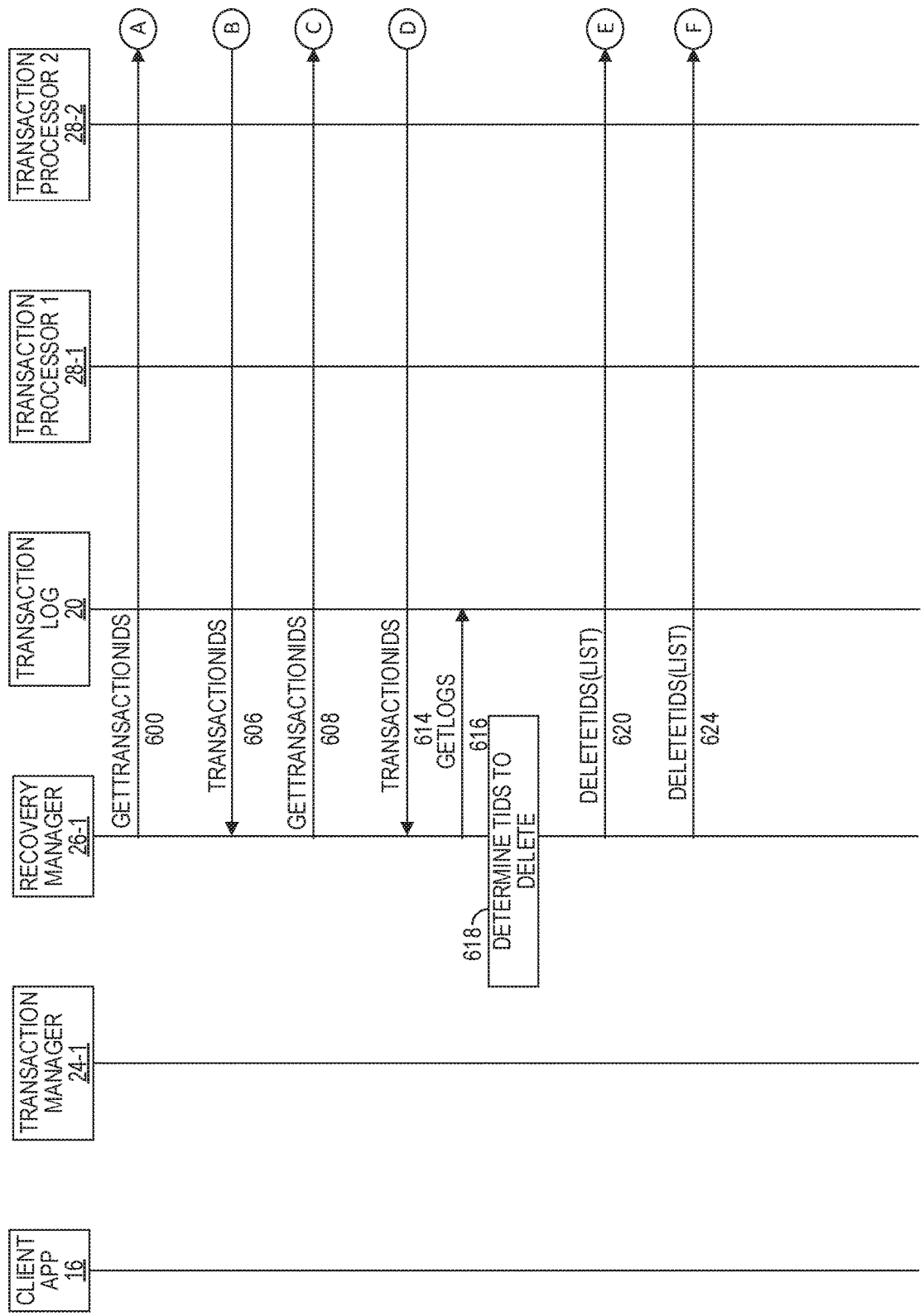
FIGS. 7A-7B illustrate a garbage collection process in a consensus-based transaction model according to one example.
Figure 7B:
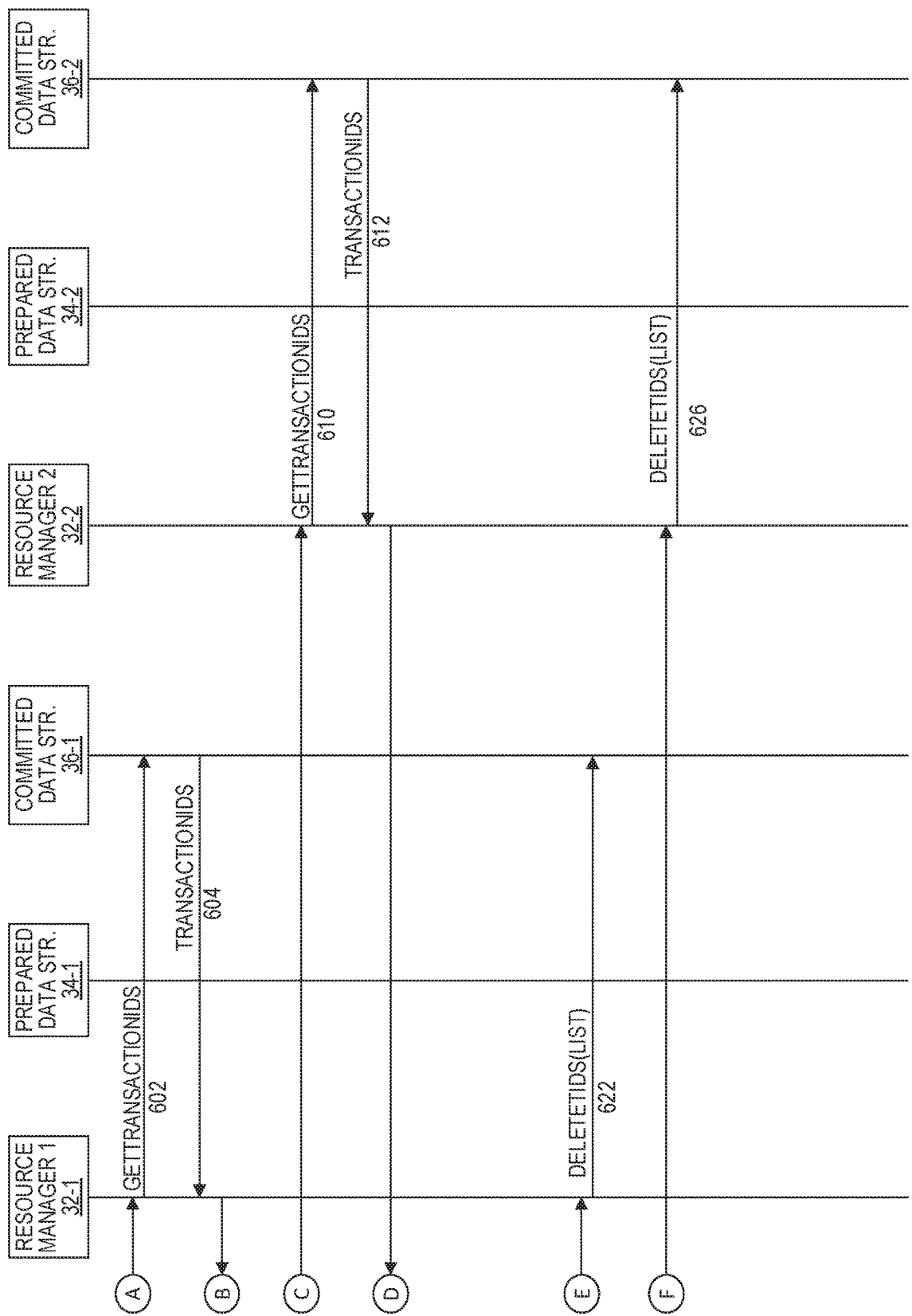

FIGS. 7A-7B illustrate a garbage collection process in a consensus-based transaction model according to one example. Periodically, or intermittently, the recovery manager 26-1 queries the resource manager 32-1 to obtain the transaction IDs in the committed data structure 36-1, and queries the resource manager 32-2 to obtain the transaction IDs in the committed data structure 36-2 (steps 600-614). The recovery manager 26-1 accesses the transaction log 20 and obtains the transaction IDs of the transactions that have been marked as completed (steps 616-618). Based on the transaction IDs of the transactions that have been marked as completed, the recovery manager 26-1 generates a list of transaction IDs that can be deleted from the committed data structure 36-1 and the committed data structure 36-2 (step 618). The recovery manager 26-1 sends an update command to the resource manager 32-1 to delete the transaction IDs in list of transaction IDs from the committed data structure 36-1 (steps 620-622). The recovery manager 26-1 also sends an update command to the resource manager 32-2 to delete the transaction IDs in the list of transaction IDs from the committed data structure 36-2 (steps 624-626).

Figure 8:
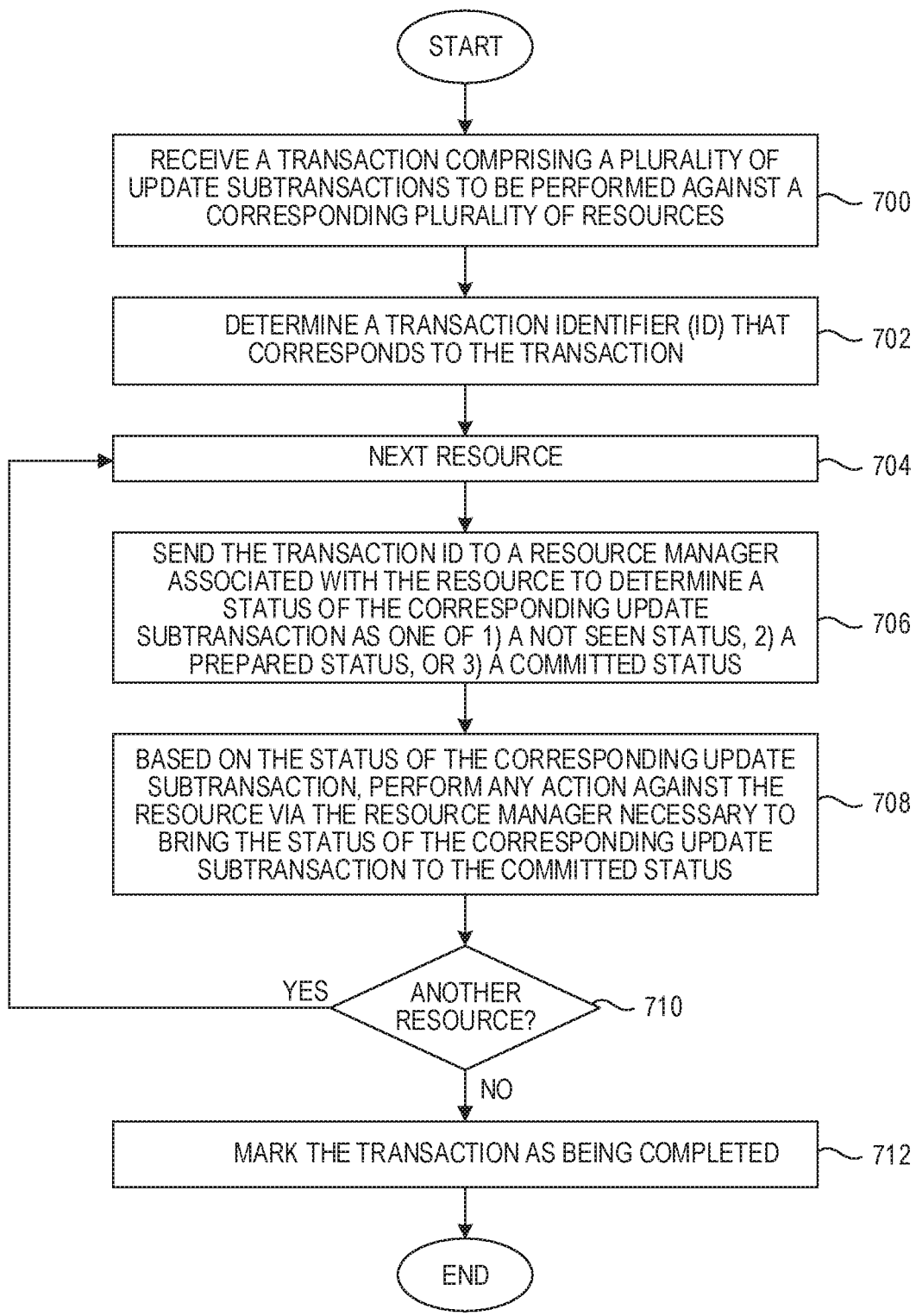
FIG. 8 is a flowchart illustrating a method for processing an atomic transaction in a consensus-based transaction model according to one example.

FIG. 8 is a flowchart illustrating a method for processing an atomic transaction in a consensus-based transaction model according to one example. FIG. 8 will be discussed in conjunction with FIG. 1. The transaction processor 28-1 receives the transaction 38 comprising the plurality of update subtransactions 40-1, 40-2 to be performed against the plurality of resources 30-1, 30-2 (FIG. 8, block 700). The transaction processor 28-1 determines the transaction ID 42 that corresponds to the transaction 38 (FIG. 8, block 702).

For the resource 30-1, the transaction processor 28-1 sends the transaction ID 42 to the resource manager 32-1 associated with the resource 30-1 to determine a status of the corresponding update subtransaction 40-1 as one of 1) a not seen status, 2) a prepared status, or 3) a committed status (FIG. 8, blocks 704-706). Based on the status of the corresponding update subtransaction 40-1, the transaction processor 28-1 performs any action against the resource 30-1 via the resource manager 32-1 that is necessary to bring the status of the corresponding update subtransaction 40-1 to the committed status (FIG. 8, block 708). The transaction processor 28-1 repeats this process for each resource 30 (FIG. 8, blocks 710, 704). The transaction processor 28-1 marks the transaction 38 as being completed (FIG. 8, block 712).

Note that the actions necessary to bring a resource 30 to the committed status may first require other actions to other resources 30 involved in the transaction 38. For example, before bringing any resource 30 involved in the transaction 38 to the prepared status, the transaction processor 28-1 may first perform the corresponding update subtransactions in each other resource 30, and only after each resource 30 has been updated, bring all resources 30 into the prepared status in succession. Similarly, before bringing any resource 30 in the transaction 38 to a committed status, the transaction processor 28-1 may first bring all resources 30 into the prepared status, and then bring all the resources to the committed status only if each resource 30 was able to be put into the prepared status.

Figure 9:
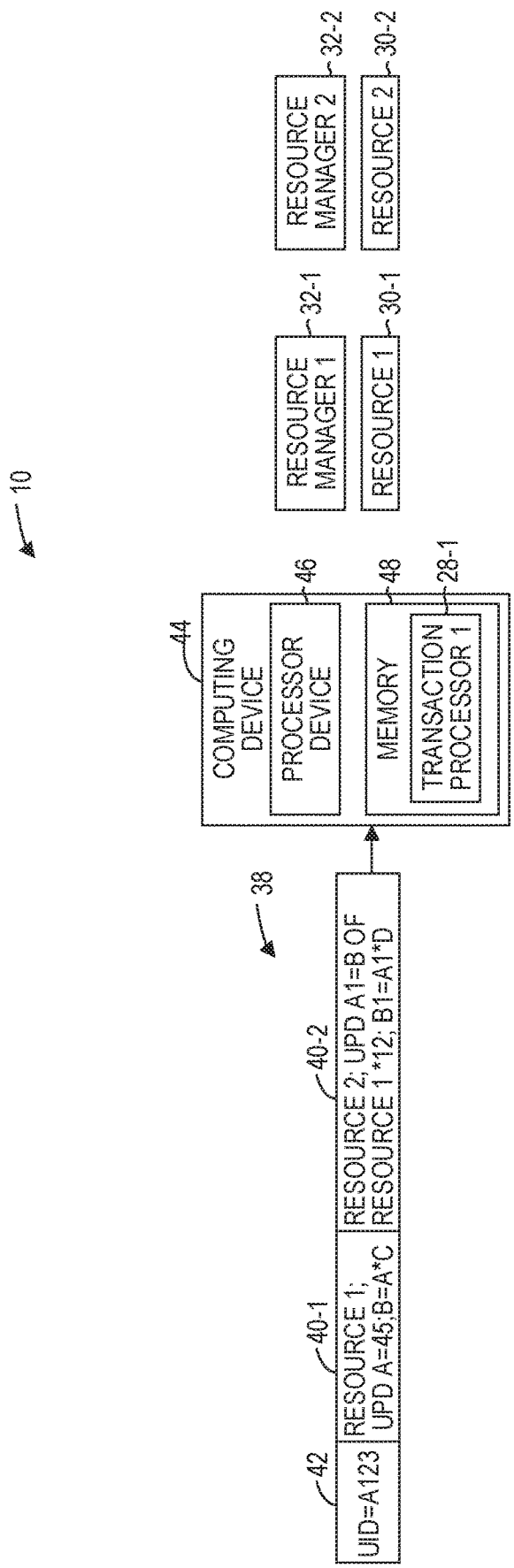
FIG. 9 is a simplified block diagram of FIG. 1 according to one example.

FIG. 9 is a simplified block diagram of FIG. 1 according to one example. In this example, the compute instance 12-5 (FIG. 1) is implemented via a computing device 44. The computing device 44 includes a processor device 46 and a memory 48. The processor device 46 is coupled to the memory 48 and is to receive the transaction 38 comprising the plurality of update subtransactions 40-1, 40-2 to be performed against the plurality of resources 30-1, 30-2 (FIG. 8, block 700). The transaction processor 28-1 determines the transaction ID 42 that corresponds to the transaction 38. For the resource 30-1, the transaction processor 28-1 sends the transaction ID to the resource manager 32-1 associated with the resource 30-1 to determine a status of the corresponding update subtransaction 40-1 as one of 1) a not seen status, 2) a prepared status, or 3) a committed status. Based on the status of the subtransaction 40-1 the transaction processor 28-1 performs any action against the resource 30-1 via the resource manager 32-1 that is necessary to bring the status of the corresponding update subtransaction 40-1 to the committed status. The transaction processor 28-1 repeats this process for each resource 30. The transaction processor 28-1 marks the corresponding transaction 38 as being completed.

Figure 10:
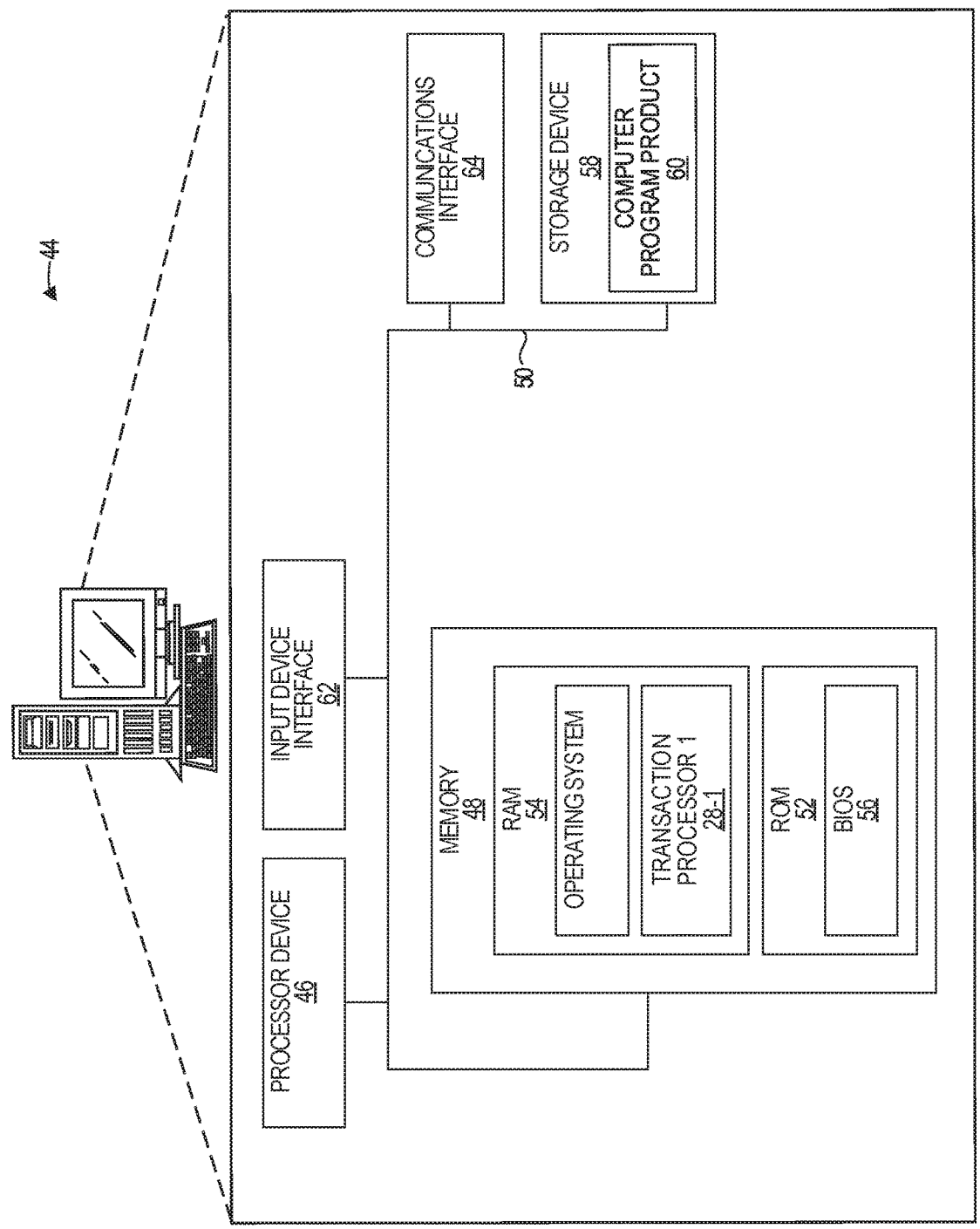
FIG. 10 is a block diagram illustrating a computing device suitable for implementing aspects of the examples.

FIG. 10 is a block diagram illustrating the computing device 44 according to one example. While the computing device 44 was discussed in FIG. 9 in conjunction with implementing the transaction processer 28-1, in some examples the computing device 44 may also be suitable for implementing the transaction manager 24, the recovery manager 26 and the resource manager 32. The computing device 44 may comprise any computing or electronic device capable of including firmware, hardware, and/or executing software instructions to implement the functionality described herein, such as a computer server, a desktop computing device, a laptop computing device, or the like. The computing device 44 includes the processor device 46, the memory 48, and a system bus 50. The system bus 50 provides an interface for system components including, but not limited to, the memory 48 and the processor device 46. The processor device 46 can be any commercially available or proprietary processor.

The system bus 50 may be any of several types of bus structures that may further interconnect to a memory bus (with or without a memory controller), a peripheral bus, and/or a local bus using any of a variety of commercially available bus architectures. The memory 48 may include non-volatile memory 52 (e.g., read-only memory (ROM), erasable programmable read-only memory (EPROM), electrically erasable programmable read-only memory (EEPROM), etc.), and volatile memory 54 (e.g., random-access memory (RAM)). A basic input/output system (BIOS) 56 may be stored in the non-volatile memory 52 and can include the basic routines that help to transfer information between elements within the computing device 44. The volatile memory 54 may also include a high-speed RAM, such as static RAM, for caching data.

The computing device 44 may further include or be coupled to a non-transitory computer-readable storage medium such as a storage device 58, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 58 and other drives associated with computer-readable media and computer-usable media may provide nonvolatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 58 and in the volatile memory 54, including an operating system and one or more program modules, such as the transaction processor 28, the transaction manager 24, the recovery manager 26 and the resource manager 32, which may implement the functionality described herein in whole or in part.

All or a portion of the examples may be implemented as a computer program product 60 stored on a transitory or non-transitory computer-usable or computer-readable storage medium, such as the storage device 58, which includes complex programming instructions, such as complex computer-readable program code, to cause the processor device 46 to carry out the steps described herein. Thus, the computer-readable program code can comprise software instructions for implementing the functionality of the examples described herein when executed on the processor device 46.

An operator may be able to enter one or more configuration commands through a keyboard (not illustrated), a pointing device such as a mouse (not illustrated), or a touch-sensitive surface such as a display device (not illustrated). Such input devices may be connected to the processor device 46 through an input device interface 62 that is coupled to the system bus 50 but can be connected by other interfaces such as a parallel port, an Institute of Electrical and Electronic Engineers (IEEE) 1394 serial port, a Universal Serial Bus (USB) port, an IR interface, and the like.

The computing device 44 may also include a communications interface 64 suitable for communicating with the network 14 as appropriate or desired.

Individuals will recognize improvements and modifications to the preferred examples of the dis wants to closure. All such improvements and modifications are considered within the scope of the concepts disclosed herein and the claims that follow.

What is claimed is:

1. A method comprising:
    receiving, by a first transaction processor of a plurality of transaction processors, a transaction comprising a plurality of update subtransactions to be performed against a corresponding plurality of resources;
    determining a transaction identifier (ID) that corresponds to the transaction;
        prior to performing a first update subtransaction of the plurality of update subtransactions against a first resource of the plurality of resources, sending the transaction ID to a first resource manager associated with the first resource to determine a status of the first update subtransaction;
        receiving, by the first transaction processor from the first resource manager, the status of the first update subtransaction that indicates the first update subtransaction has been committed against the first resource;
        prior to performing a second update subtransaction of the plurality of update transactions against a second resource of the plurality of resources, sending the transaction ID to a second resource manager associated with the second resource to determine a status of the second update subtransaction, wherein the second resource manager is a different resource manager than the first resource manager;
        receiving, by the first transaction processor from the second resource manager, the status of the second update subtransaction that indicates the second update subtransaction has not been committed against the second resource;
        based on the status of the second update subtransaction, performing at least one action against the second resource via the second resource manager to bring the status of the second update subtransaction to a committed status; and
    marking the transaction as being completed.

2. The method of claim 1 wherein sending the transaction ID to the first resource manager to determine the status of the first update subtransaction comprises:
    querying a first committed data structure associated with the first resource with the transaction ID;
    determining that the transaction ID is in the first committed data structure;
    determining that the status of the first update subtransaction is the committed status based on determining that the transaction ID is in the first committed data structure; and
    performing no additional actions against the first resource with respect to the first update subtransaction.

3. The method of claim 2 wherein sending the transaction ID to the second resource manager to determine the status of the second update subtransaction comprises:
    querying a second committed data structure associated with the second resource with the transaction ID;
    determining that the transaction ID is not in the second committed data structure;
    querying a prepared data structure associated with the second resource with the transaction ID;
    determining that the transaction ID is in the prepared data structure;
    determining that the status of the second update subtransaction is a prepared status based on determining that the transaction ID is in the prepared data structure; and
    wherein performing the at least one action against the second resource via the second resource manager to bring the status of the second update subtransaction to the committed status comprises performing a commit operation against the second resource to bring the status of the second update subtransaction to the committed status.

4. The method of claim 1 wherein sending the transaction ID to the second resource manager to determine the status of the second update subtransaction comprises:
    querying a committed data structure associated with the second resource with the transaction ID;
    determining that the transaction ID is not in the committed data structure;
    querying a prepared data structure associated with the second resource with the transaction ID;
    determining that the transaction ID is not in the prepared data structure;
    determining that the status of the second update subtransaction is a not seen status based on determining that the transaction ID is not in the prepared data structure; and
    wherein performing the at least one action against the second resource via the second resource manager to bring the status of the second update subtransaction to the committed status comprises:
  performing the second update subtransaction against the second resource;
  performing a prepared operation against the second resource; and
  performing a commit operation against the second resource.

5. The method of claim 1 wherein receiving the transaction comprising the plurality of update subtransactions to be performed against the corresponding plurality of resources comprises receiving the transaction from a transaction manager.

6. The method of claim 1 wherein receiving the transaction comprising the plurality of update subtransactions to be performed against the corresponding plurality of resources comprises:
  accessing a transaction queue; and
  extracting the transaction from the transaction queue.

7. The method of claim 1 wherein the corresponding plurality of resources comprises corresponding databases.

8. The method of claim 1, wherein the transaction was previously partially processed by a different transaction processor of the plurality of transaction processors.

9. A computing device, comprising:
  a memory; and
  a processor device coupled to the memory to:
    receive, by a first transaction processor of a plurality of transaction processors, a transaction comprising a plurality of update subtransactions to be performed against a corresponding plurality of resources;
    determine a transaction identifier (ID) that corresponds to the transaction;
    prior to performing a first update subtransaction of the plurality of update subtransactions against a first resource of the plurality of resources, send the transaction ID to a first resource manager associated with the first resource to determine a status of the first update subtransaction;
    receive, by the first transaction processor from the first resource manager, the status of the first update subtransaction that indicates the first update subtransaction has been committed against the first resource;
    prior to performing a second update subtransaction of the plurality of update transactions against a second resource of the plurality of resources, send the transaction ID to a second resource manager associated with the second resource to determine a status of the second update subtransaction, wherein the second resource manager is a different resource manager than the first resource manager;
    receive, by the first transaction processor from the second resource manager, the status of the second update subtransaction that indicates the second update subtransaction has not been committed against the second resource;
    based on the status of the second update subtransaction, perform at least one action against the second resource via the second resource manager to bring the status of the second update subtransaction to a committed status; and
    mark the transaction as being completed.

10. The computing device of claim 9 wherein to send the transaction ID to the first resource manager to determine the status of the first update subtransaction, the processor device is further to:
  query a first committed data structure associated with the first resource with the transaction ID;
  determine that the transaction ID is in the first committed data structure;
  determine that the status of the first update subtransaction is the committed status based on determining that the transaction ID is in the first committed data structure; and
  perform no additional actions against the first resource with respect to the first update subtransaction.

11. The computing device of claim 9 wherein to send the transaction ID to the second resource manager to determine the status of the second update subtransaction, the processor device is further to:
  query a committed data structure associated with the second resource with the transaction ID;
  determine that the transaction ID is not in the committed data structure;
  query a prepared data structure associated with the second resource with the transaction ID;
  determine that the transaction ID is not in the prepared data structure;
  determine that the status of the second update subtransaction is a not seen status based on determining that the transaction ID is not in the prepared data structure; and
  wherein to perform the at least one action against the second resource via the second resource manager to bring the status of the second update subtransaction to the committed status, the processor device is to:
    perform the second update subtransaction against the second resource;
    perform a prepared operation against the second resource; and
    perform a commit operation against the second resource.

12. A computer program product stored on a non-transitory computer-readable storage medium and including instructions configured to cause a processor device to:
  receive, by a first transaction processor of a plurality of transaction processors, a transaction comprising a plurality of update subtransactions to be performed against a corresponding plurality of resources;
  determine a transaction identifier (ID) that corresponds to the transaction;
  prior to performing a first update subtransaction of the plurality of update subtransactions against a first resource of the plurality of resources, send the transaction ID to a first resource manager associated with the first resource to determine a status of the first update subtransaction;
  receive, by the first transaction processor from the first resource manager, the status of the first update subtransaction that indicates the first update subtransaction has been committed against the first resource;
  prior to performing a second update subtransaction of the plurality of update transactions against a second resource of the plurality of resources, send the transaction ID to a second resource manager associated with the second resource to determine a status of the second update subtransaction, wherein the second resource manager is a different resource manager than the first resource manager;
  receive, by the first transaction processor from the second resource manager, the status of the second update subtransaction that indicates the second update subtransaction has not been committed against the second resource;

based on the status of the second update subtransaction, perform at least one action against the second resource via the second resource manager to bring the status of the second update subtransaction to a committed status; and mark the transaction as being completed.

13. The computer program product of claim 12 wherein to send the transaction ID to the first resource manager to determine the status of the first update subtransaction, the instructions further cause the processor device to:
    query a first committed data structure associated with the first resource with the transaction ID;
    determine that the transaction ID is in the first committed data structure;
    determine that the status of the first update subtransaction is the committed status based on determining that the transaction ID is in the first committed data structure; and
    perform no additional actions against the first resource with respect to the first update subtransaction.

14. The computer program product of claim 12 wherein to send the transaction ID to the second resource manager to determine the status of the second update subtransaction, the instructions further cause the processor device to:
    query a committed data structure associated with the second resource with the transaction ID;
    determine that the transaction ID is not in the second committed data structure;
    query a prepared data structure associated with the second resource with the transaction ID;
    determine that the transaction ID is not in the prepared data structure;
    determine that the status of the second update subtransaction is a not seen status based on determining that the transaction ID is not in the prepared data structure; and
    wherein to perform the at least one action against the second resource via the second resource manager to bring the status of the second update subtransaction to the committed status the instructions further cause the processor device to:
    perform the second update subtransaction against the second resource;
    perform a prepared operation against the second resource; and
    perform a commit operation against the second resource.

* * * * *